(12) United States Patent
Yang et al.

(10) Patent No.: US 12,511,052 B2
(45) Date of Patent: Dec. 30, 2025

(54) MEMORY DEVICES AND OPERATION METHODS THEREOF, AND MEMORY SYSTEMS FOR MANAGING PAGE BUFFER

(71) Applicant: Yangtze Memory Technologies Co., Ltd., Hubei (CN)

(72) Inventors: Fan Yang, Hubei (CN); Ning Zhang, Hubei (CN); Ke Liang, Hubei (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 0 days.

(21) Appl. No.: 18/805,200

(22) Filed: Aug. 14, 2024

(65) Prior Publication Data

US 2025/0335099 A1    Oct. 30, 2025

(30) Foreign Application Priority Data

Apr. 29, 2024   (CN) .......................... 202410535119.2

(51) Int. Cl.
*G06F 3/06* (2006.01)
(52) U.S. Cl.
CPC .......... *G06F 3/0613* (2013.01); *G06F 3/0656* (2013.01); *G06F 3/0679* (2013.01)

(58) Field of Classification Search
CPC ..... G06F 3/0613; G06F 3/0656; G06F 3/0679
USPC .......................................................... 711/150
See application file for complete search history.

(56) References Cited

U.S. PATENT DOCUMENTS

| 2015/0179269 A1* | 6/2015 | Lee ..................... G11C 16/3459<br>365/185.03 |
| 2016/0180947 A1* | 6/2016 | Lim ....................... G11C 29/04<br>365/185.11 |
| 2018/0373440 A1* | 12/2018 | Shah .................... G06F 12/0804 |
| 2022/0223190 A1* | 7/2022 | Kim ....................... G11C 16/08 |

* cited by examiner

*Primary Examiner* — Than Nguyen
(74) *Attorney, Agent, or Firm* — Hanley, Flight & Zimmerman, LLC

(57) ABSTRACT

Examples of the present disclosure provide a memory device and an operation method thereof, and a memory system. The memory device includes: a memory cell array including memory cells, wherein the memory cells are divided into memory planes; bit lines; page buffer circuits, wherein each of the page buffer circuits includes page buffer groups, and corresponds to one of the memory planes, and the page buffer circuit performs a buffer operation in response to a buffer operation command; and a control logic coupled to the page buffer groups and configured to: for each of the memory planes, provide the buffer operation command to the plurality of page buffer groups, and control performing time periods for the page buffer groups to perform the buffer operation such that some performing time periods among the plurality of performing time periods overlaps.

20 Claims, 15 Drawing Sheets

For each of the memory planes, providing the buffer operation command to the plurality of page buffer groups, and controlling performing time periods for the plurality of page buffer groups to perform the buffer operation such that some performing time periods among the plurality of performing time periods overlaps — 1200

FIG. 12

MEMORY DEVICES AND OPERATION METHODS THEREOF, AND MEMORY SYSTEMS FOR MANAGING PAGE BUFFER

CROSS-REFERENCE TO RELATED APPLICATION

The present disclosure claims the benefit of priority to China Application No. 202410535119.2, filed on Apr. 29, 2024, the content of which is incorporated herein by reference in its entirety.

TECHNICAL FIELD

Examples of the present disclosure relate to the field of semiconductor technology, and particularly to memory devices and operation methods thereof, and memory systems.

BACKGROUND

A flash memory device is a low-cost, high-density, non-volatile solid-state storage medium that can be electrically erased and reprogrammed. The flash memory device comprises a NOR flash memory device and a NAND flash memory device. Various operations such as read, program (write), and erase can be performed by the flash memory device to change a threshold voltage of each memory cell to a desired level. For the NAND flash memory device, the erase operation can be performed on a memory block basis, and the program operation or read operation can be performed on a page basis.

BRIEF DESCRIPTION OF THE DRAWINGS

FIG. 12 shows a schematic diagram of an implementation flow of an operation method of a memory device according to an example of the present disclosure.

DETAILED DESCRIPTION

Figure 1:
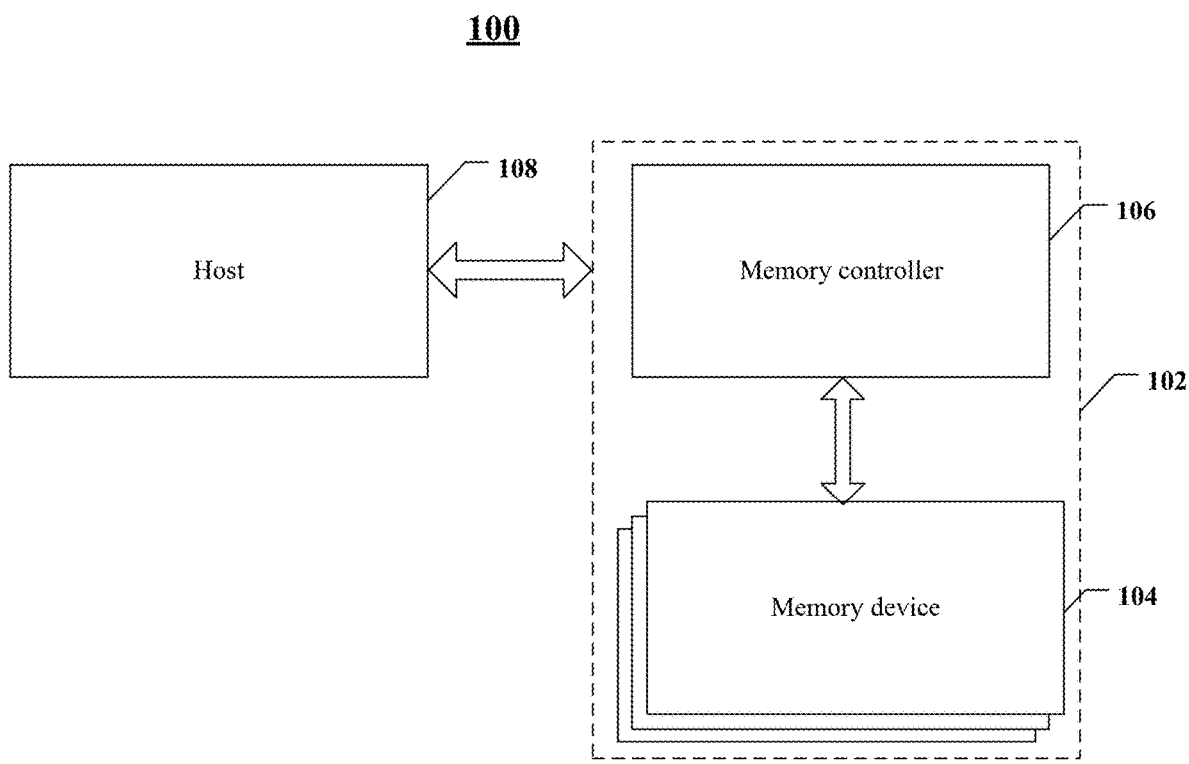
FIG. 1 shows a schematic diagram of an example system having a memory system according to an example of the present disclosure.

The technical solutions in implementations of the present disclosure will be described below clearly and completely in conjunction with the implementations and the drawings of the present disclosure. Apparently, the implementations described are only part, but not all, of the implementations of the present disclosure. All other implementations obtained by those of ordinary skills in the art based on the implementations in the present disclosure without creative work shall fall within the scope of protection of the present disclosure.

In the description below, many specific details are presented to provide a more thorough understanding of the present disclosure. However, it is apparent to those skilled in the art that the present disclosure may be implemented without one or more of these details. In other examples, in order to avoid confusion with the present disclosure, some technical features well-known in the field are not described. That is, all the features of the actual examples are not described here, and well-known functions and structures are not described in detail.

In the drawings, the sizes of a layer, a region, and an element and their relative sizes may be exaggerated for clarity. Like reference numerals denote like elements throughout the specification.

It is to be understood that when an element or a layer is referred to as being "on", "adjacent to", "connected to", or "coupled to" other elements or layers, it may be directly on, adjacent to, connected to, or coupled to the other elements or layers, or intervening elements or layers may be present. In contrast, when an element is referred to as being "directly on", "immediately adjacent to", "directly connected to", or "directly coupled to" other elements or layers, no intervening elements or layers are present. It is to be understood that, although terms first, second, third and the like may be used to describe various elements, components, regions, layers and/or sections, these elements, components, regions, layers and/or sections should not be limited by these terms. These terms are only used to distinguish one element, component, region, layer or portion from another element, component, region, layer or portion. Thus, a first element, component, region, layer or portion discussed below may be represented as a second element, component, region, layer or portion, without departing from the teachings of the present disclosure. However, when the second element, component, region, layer or portion is discussed, it does not mean that the first element, component, region, layer or portion is necessarily present in the present disclosure.

The spatially relative terms, such as "beneath", "below", "lower", "under", "above", "upper", and the like, may be used herein for ease of description to describe one element or feature's relationship to other elements or features as illustrated in the figures. It is to be understood that, the spatially relative terms are intended to further encompass different orientations of a device in use or operation in addition to the orientation depicted in the figures. For example, if the device in the drawings is turned over, then the elements or the features described as "below" or "under" or "beneath" other elements may be oriented "on" the other elements or features. Thus, the example terms, "below" and "beneath", may comprise both upper and lower orientations. The device may be orientated otherwise (rotated by 90 degrees or other orientations), and the spatially descriptors used herein are interpreted accordingly.

The terms used herein are only intended to describe the examples, and are not used as limitations of the present disclosure. As used herein, unless otherwise indicated expressly in the context, "a", "an" and "the" in a singular form are also intended to comprise a plural form. It should also be understood that terms "consist of" and/or "comprise", when used in this specification, determine the presence of the described features, integers, steps, operations, elements and/or components, but do not preclude the presence or addition of one or more of other features, integers, steps, operations, elements, components, and/or groups. As used herein, the term "and/or" comprises any or all combinations of the listed relevant items.

In order to understand the present disclosure thoroughly, detailed steps and detailed structures will be proposed in the following description to set forth the technical solutions of the present disclosure. The detailed descriptions of the preferred examples of the present disclosure are as follows. However, the present disclosure may also have other implementations in addition to these detailed descriptions.

FIG. 1 shows a block diagram of an example system 100 having a memory device according to some aspect of the present disclosure. The system 100 may comprise a mobile phone, a desktop computer, a laptop computer, a tablet computer, a vehicle computer, a gaming console, a printer, a positioning apparatus, a wearable electronic apparatus, a smart sensor, a Virtual Reality (VR) apparatus, an Augmented Reality (AR) apparatus, or any other suitable electronic apparatus having a storage therein. As shown in FIG. 1, the system 100 may comprise a host 108 and a memory system 102, and the memory system 102 is provided with one or more memory devices 104 and a memory controller 106. The host 108 may be a processor of an electronic apparatus (e.g., a Central Processing Unit (CPU)) or a System-on-a-chip (SoC) (such as an Application Processor (AP)). The host 108 may be configured to send or receive data to or from the memory device 104.

According to some implementations, the memory controller 106 is coupled to the memory device 104 and the host 108, and is configured to control the memory device 104. The memory controller 106 may manage data stored in the memory device 104, and communicate with the host 108. In some implementations, the memory controller 106 is designed for operating in a low duty-cycle environment, such as Secure Digital (SD) cards, Compact Flash (CF) cards, Universal Serial Bus (USB) flash drives, or other media for use in electronic apparatuses, such as personal computers, digital cameras, mobile phones, etc. In some implementations, the memory controller 106 is designed for operating in a high duty-cycle environment Solid State Drives (SSDs) or embedded Multi Media Cards (eMMCs) used as data memories for mobile apparatuses, such as smartphones, tablet computers, laptop computers, etc., and enterprise memory arrays.

The memory controller 106 may be configured to control operations of the memory device 104, such as read, erase, and program operations. The memory controller 106 may further be configured to manage various functions with respect to data stored or to be stored in the memory device 104, including, but not limited to, bad-block management, garbage collection, logical-to-physical address translation, wear leveling, etc. In some implementations, the memory controller 106 is further configured to process Error Checking and Correcting (ECC) codes with respect to the data read from or written to the memory device 104. The memory controller 106 may further perform any other suitable functions, for example, formatting the memory device 104. The memory controller 106 may communicate with an external apparatus (e.g., the host 108) according to a specific communication protocol. For example, the memory controller 106 may communicate with the external apparatus through at least one of various interface protocols, such as a USB protocol, an MMC protocol, a Peripheral Component Interconnect (PCI) protocol, a PCI-Express (PCI-E) protocol, an Advanced Technology Attachment (ATA) protocol, a serial-ATA protocol, a parallel-ATA protocol, a Small Computer System Interface (SCSI) protocol, an Enhanced Small Drive Interface (ESDI) protocol, an Integrated Drive Electronics (IDE) protocol, a Firewire interface protocol, etc.

The memory controller 106 and the one or more memory devices 104 can be integrated into various types of storage apparatuses, for example, be comprised in the same package (such as a universal flash storage (UFS) package or an eMMC package). That is to say, the memory system 102 may be implemented and packaged into different types of end electronic products. In an example shown in FIG. 2A, the memory controller 106 and the single memory device 104 may be integrated into a memory card 202. The memory card 202 may comprise a PC (PCMCIA, Personal Computer Memory Card International Association) card, a CF (Compact Flash) card, a Smart Media (SM) card, a memory stick, a multimedia card (MMC, RS-MMC, MMCmicro), a SD (Secure Digital) card (SD, miniSD, microSD, SDHC), a UFS, etc. The memory card 202 may further comprise a memory card connector 204 coupling the memory card 202 with a host (e.g., the host 108 in FIG. 1). In another example shown in FIG. 2B, the memory controller 106 and the plurality of memory devices 104 may be integrated into an SSD 206. The SSD 206 may further comprise an SSD connector 208 coupling the SSD 206 with a host (e.g., the host 108 in FIG. 1). In some implementations, at least one of a storage capacity or an operation speed of the SSD 206 is greater than at least one of a storage capacity and/or an operation speed of the memory card 202.

Figure 3:
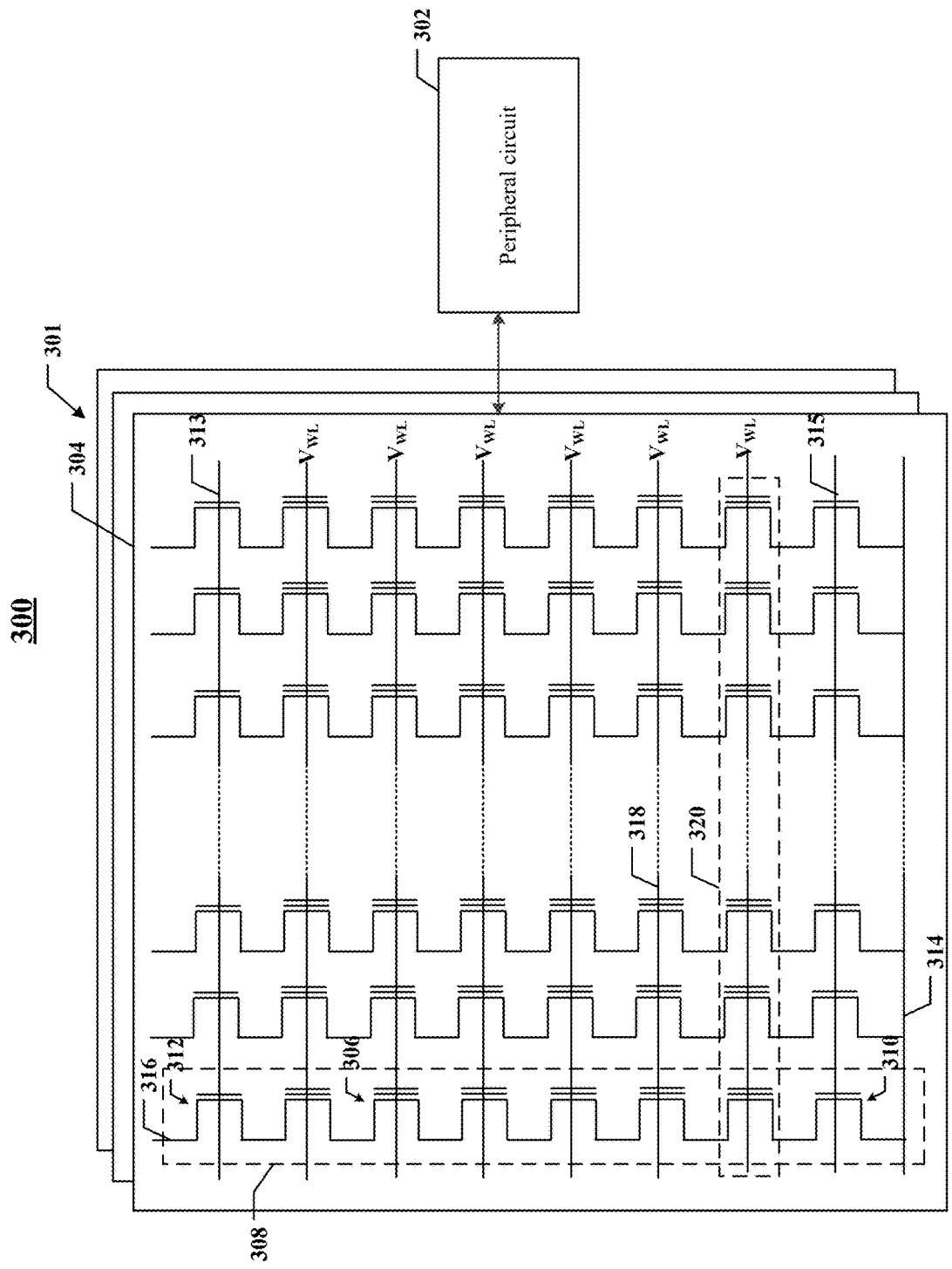
FIG. 3 shows a schematic circuit diagram of an example memory device comprising a peripheral circuit according to some aspects of the present disclosure.

FIG. 3 shows a schematic circuit diagram of an example memory device 300 comprising a peripheral circuit according to some aspects of the present disclosure. The memory device 300 may be an example of the memory device 104 in FIG. 1. The memory device 300 may comprise a memory cell array 301 and a peripheral circuit 302 coupled to the memory cell array 301. The disclosure is illustrated by taking a case in which the memory cell array 301 is a three-dimensional NAND memory cell array as an example, wherein a memory cell 306 is provided in the form of an array of NAND memory strings 308, and each NAND memory string 308 extends vertically above a substrate (not shown). In some implementations, each NAND memory string 308 comprises the plurality of memory cells 306 coupled in series and stacked vertically. Each memory cell 306 may maintain a continuous analog value, such as voltage or charge, which depends on the number of electrons trapped within a region of the memory cells 306. Each memory cell 306 may be either a floating gate type memory cell comprising a floating gate transistor, or a charge trapping type memory cell comprising a charge trapping transistor.

In some implementations, each memory cell 306 is a Single-level Cell (SLC) that has two possible memory states and thus may store one bit of data. For example, a first memory state "0" may correspond to a first voltage range, and a second memory state "1" may correspond to a second voltage range. In some implementations, each memory cell 306 is a Multi-Level Cell (MLC) that can store more than one bit of data in more than four memory states. For example, the MLC may store two bits per cell, three bits per cell (also referred to as a Trinary-Level Cell (TLC)), or four bits per cell (also referred to as a Quad-Level Cell (QLC)). Each MLC may be programmed to assume a range of possible nominal storage values. In one example, if each MLC stores two bits of data, the MLC may be programmed to assume one of three possible program levels from an erased state by writing one of three possible nominal storage values to the cell. A fourth nominal storage value may be used for the erased state.

As shown in FIG. 3, each NAND memory string 308 may comprise a Bottom Select Gate (BSG) 310 at its source end and a Top Select Gate (TSG) 312 at its drain end. The BSG 310 and the TSG 312 may be configured to activate the selected NAND memory string 308 during the read and program operations. In some implementations, sources of the NAND memory strings 308 in a same memory block 304 are coupled through a same Source Line (SL) 314 (for example, a common SL). In other words, according to some implementations, all the NAND memory strings 308 in the same memory block 304 have an Array Common Source (ACS). According to some implementations, the TSG 312 of each NAND memory string 308 is coupled to a respective Bit Line (BL) 316, and data may be read or written from the bit line 316 via an output bus (not shown). In some implementations, each NAND memory string 308 is configured to be selected or deselected by applying a select voltage (e.g., above a threshold voltage of a transistor having the TSG 312) or an deselect voltage (e.g., 0 V) to the respective TSG 312 via one or more TSG lines 313 and/or by applying a select voltage (e.g., above a threshold voltage of a transistor having the BSG 310) or an deselect voltage (e.g., 0 V) to the respective BSG 310 via one or more BSG lines 315.

As shown in FIG. 3, the NAND memory strings 308 may be organized into a plurality of memory blocks 304, and each of the plurality of memory blocks 304 may have a common source line 314 (e.g., coupled to the ground). In some implementations, each memory block 304 is a basic data unit for an erase operation, i.e., all of the memory cells 306 on the same memory block 304 are erased at the same time. In order to erase the memory cells 306 in a selected memory block, the source lines 314 coupled to the selected memory block as well as unselected memory blocks that are in a same plane as the selected memory block can be biased with an erase voltage (Vers, such as a high positive voltage (e.g., 20 V or higher)). It is to be understood that in some examples, the erase operation may be performed at a half memory block level, a quarter memory block level, or a level having any suitable number of memory blocks or any suitable fractions of a memory block. The memory cells 306 of adjacent ones of the NAND memory strings 308 may be coupled through a word line 318 that selects which row of memory cells 306 is affected by the read and program operations. In some implementations, each word line 318 is coupled to a page 320 of the memory cell 306, and the page 320 is a basic data unit for the program operation. A size of one page 320 in bits may be related to the number of NAND memory strings 308 coupled by the word line 318 in one memory block 304. Each word line 318 may comprise a plurality of control gates (gate electrodes) at each memory cell 306 in the respective page 320, and a gate line coupled with the control gates.

Figure 4:
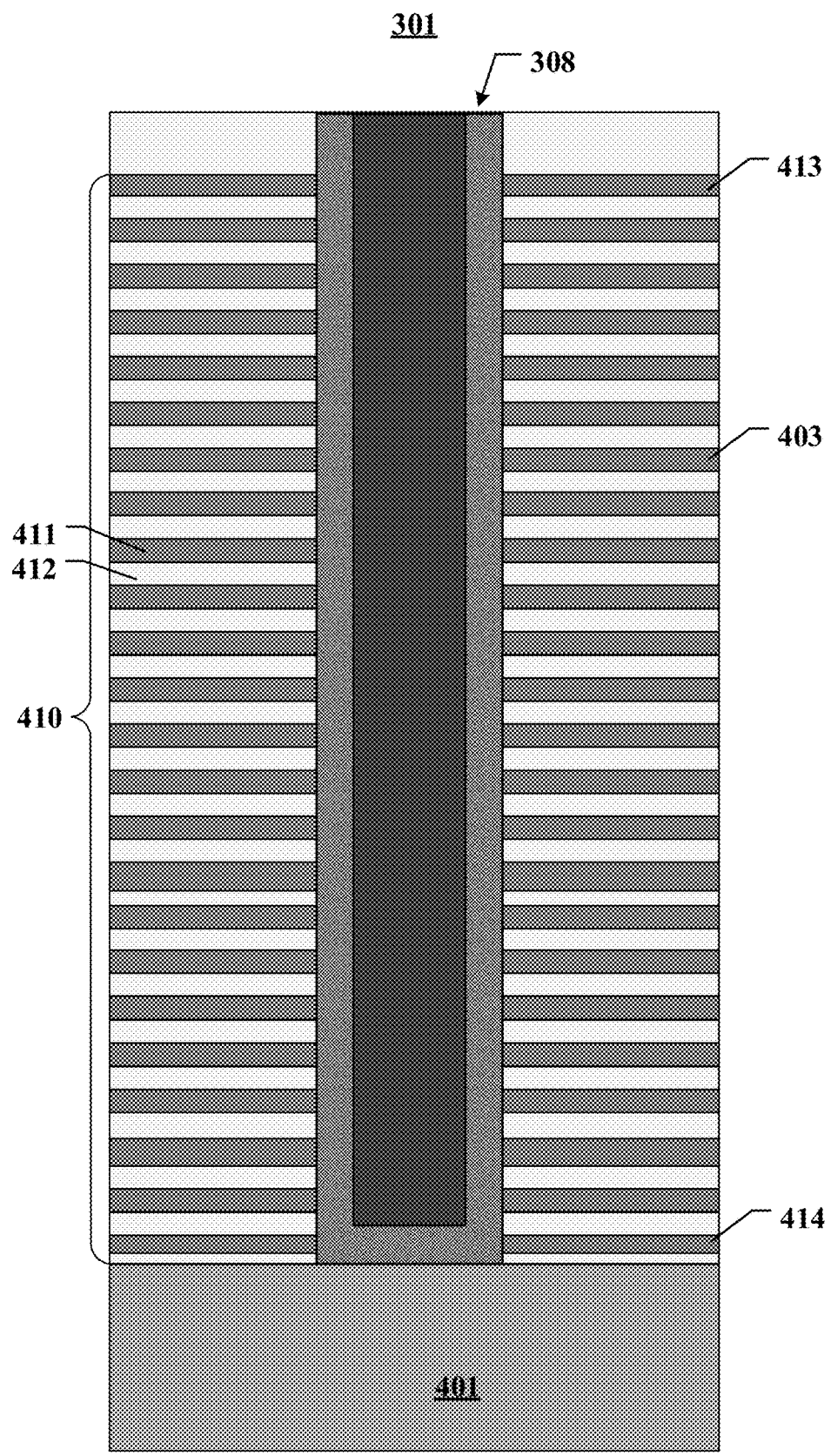
FIG. 4 shows a schematic cross-sectional view of a memory cell array comprising a NAND flash memory string according to an example of the present disclosure.

FIG. 4 shows a schematic cross-sectional view of an example memory cell array 301 comprising a NAND memory string 308 according to some aspects of the present disclosure. As shown in FIG. 4, the NAND memory string 308 may comprise a stack structure 410. The stack structure 410 comprises a plurality of gate layers 411 and a plurality of insulation layers 412, which are sequentially and alternately stacked, and a memory string 308 vertically extending through the gate layers 411 and the insulation layers 412. The gate layers 411 and the insulation layers 412 may be alternately stacked, and two adjacent gate layers 411 are spaced apart by one insulation layer 412. The number of pairs of the gate layers 411 and the insulation layers 412 in the stack structure 410 may determine the number of memory cells comprised in the memory cell array 301.

A constituent material of the gate layers 411 may comprise a conductive material. The conductive material includes, but is not limited to, tungsten (W), cobalt (Co), copper (Cu), aluminum (Al), polysilicon, doped silicon, silicides, or any combination thereof. In some implementations, each gate layer 411 comprises a metal layer, e.g., a tungsten layer. In some implementations, each gate layer 411 comprises a doped polysilicon layer. Each gate layer 411 may comprise a control gate surrounding the memory cells. The gate layer 411 at the top of the stack structure 410 may extend laterally as a top select gate line; the gate layer 411 at the bottom of the stack structure 410 may extend laterally as a bottom select gate line; and the gate layers 411 that extend laterally between the top select gate line and the bottom select gate line may act as word line layers.

In some examples, the stack structure 410 may be disposed on a substrate 401. The substrate 401 may comprise silicon (e.g., single crystalline silicon), silicon germanium (SiGe), gallium arsenide (GaAs), germanium (Ge), a Silicon-on-Insulator (SOI), a Germanium-on-Insulator (GOI), or any other suitable materials.

In some examples, the NAND memory string 308 comprises a channel structure that extends through the stack structure 410 vertically. In some implementations, the channel structure comprises a channel hole filled with (one or more) semiconductor materials (e.g., as a semiconductor channel) and (one or more) dielectric materials (e.g., as a memory film). In some implementations, the semiconductor channel comprises silicon, e.g., polysilicon. In some implementations, the memory film is a composite dielectric layer comprising a tunneling layer, a storage layer (also referred to as a "charge trapping/storage layer"), and a blocking layer. The channel structure may have a cylindrical shape (e.g., a pillar shape). According to some implementations, the semiconductor channel, the tunneling layer, the storage layer, and the blocking layer are arranged radially from the center toward the outer surface of the pillar in this order. The tunneling layer may comprise silicon oxide, silicon oxynitride, or any combination thereof. The storage layer may comprise silicon nitride, silicon oxynitride, or any combination thereof. The blocking layer may comprise silicon oxide, silicon oxynitride, a high dielectric constant (high-k) dielectric, or any combination thereof. In one example, the memory film may comprise a composite layer of silicon oxide/silicon oxynitride/silicon oxide (ONO).

Figure 5:
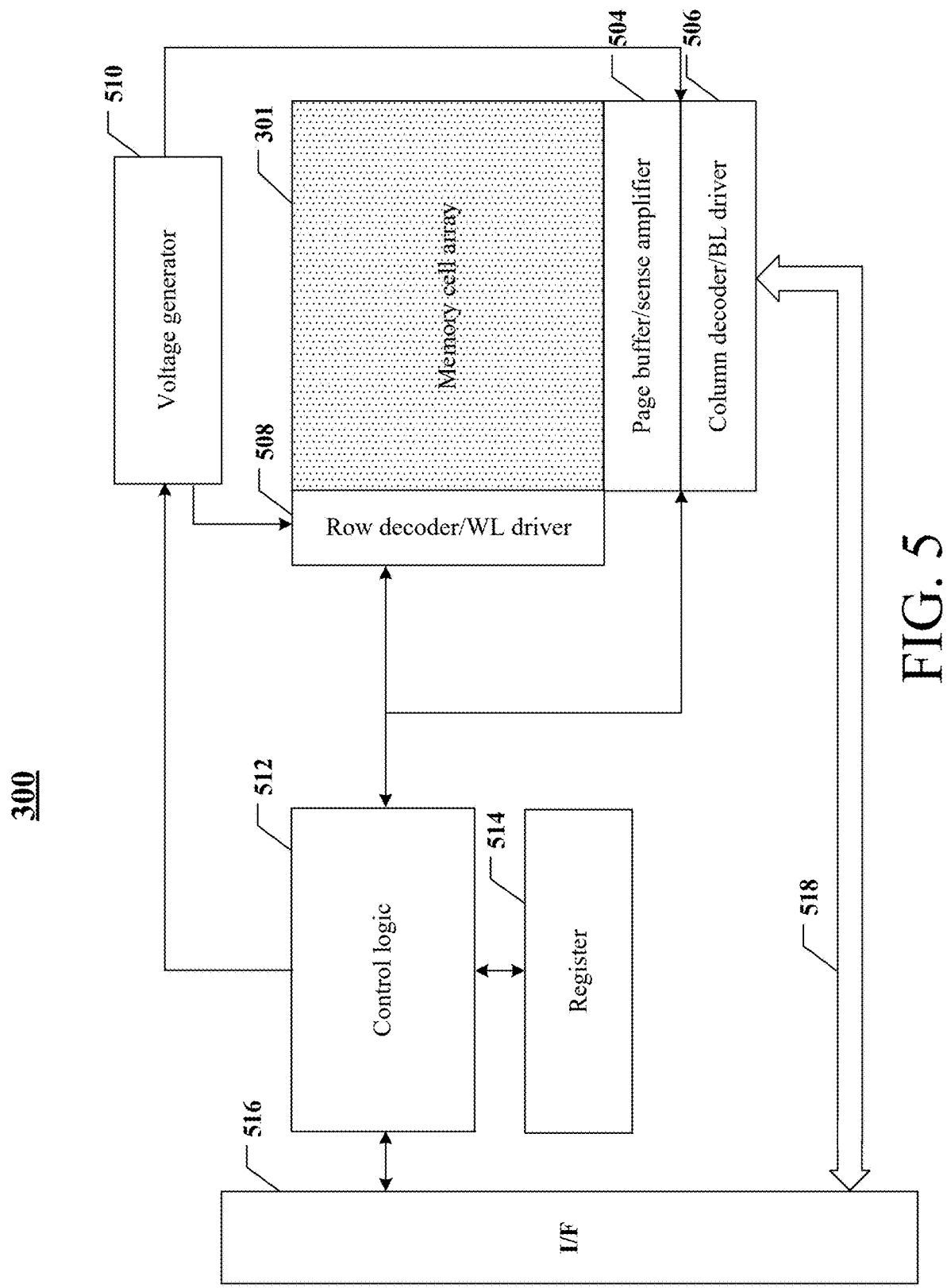
FIG. 5 shows a schematic diagram of an example memory device comprising a memory cell array and a peripheral circuit according to an example of the present disclosure.

Referring back to FIG. 3, the peripheral circuit 302 may be coupled to the memory cell array 301 through the bit line 316, the word line 318, the source line 314, the BSG line 315, and the TSG line 313. The peripheral circuit 302 may comprise any suitable analog, digital, and hybrid signal circuits to facilitate the operations of the memory cell array 301 by applying and sensing voltage signals and/or current signals to and from each target memory cell 306 via the bit line 316, the word line 318, the source line 314, the BSG line 315, and the TSG line 313. The peripheral circuit 302 may comprise various types of peripheral circuits formed using a Metal-Oxide-Semiconductor (MOS) technology. For example, FIG. 5 shows some example peripheral circuits. The peripheral circuit 302 comprises a page buffer/sense amplifier 504, a column decoder/bit line driver 506, a row decoder/word line driver 508, a voltage generator 510, a control logic 512, a register 514, an interface 516, and a data bus 518. It is to be understood that, in some examples, additional peripheral circuits not shown in FIG. 5 may also be comprised as well.

The page buffer/sense amplifier 504 may be configured to read and program (write) data from and to the memory cell array 301 according to a control signal from the control logic 512. In one example, the page buffer/sense amplifier 504 may store one page of program data (write data) to be programmed into one page 320 of the memory cell array 301. In another example, the page buffer/sense amplifier 504 may perform a program verification operation to ensure that the data has been properly programmed into the memory cell 306 coupled to the selected word line 318. In yet another example, the page buffer/sense amplifier 504 may also sense a low power signal from the bit line 316 that represents a data bit stored in the memory cell 306, and amplifies a small voltage swing to a recognizable logic level in the read operation. The column decoder/bit line driver 506 may be configured to be controlled by the control logic 512 and select one or more NAND memory strings 308 by applying a bit line voltage generated from the voltage generator 510.

The row decoder/word line driver 508 may be configured to be controlled by the control logic 512, select/deselect the memory blocks 304 of the memory cell array 301, and select/deselect the word lines 318 of the memory blocks 304. The row decoder/word line driver 508 may further be configured to drive the word lines 318 using a word line voltage generated from the voltage generator 510. In some implementations, the row decoder/word line driver 508 may also select/deselect and drive the BSG line 315 and the TSG line 313. As described below in detail, the row decoder/word line driver 508 is configured to perform the program operation on the memory cells 306 coupled to (one or more) selected word lines 318. The voltage generator 510 may be configured to be controlled by the control logic 512 and generate the word line voltage (such as, a read voltage, a program voltage, a pass voltage, a channel boost voltage, a verify voltage, etc.), the bit line voltage, and a source line voltage, which are to be supplied to the memory cell array 301.

The control logic 512 may be coupled to each peripheral circuit described above and configured to control operations of each peripheral circuit. The register 514 may be coupled to the control logic 512 and comprise a state register, a command register, and an address register for storing state information, a command operation code (OP code), and a command address for controlling the operations of each peripheral circuit. The interface 516 may be coupled to the control logic 512, and act as a control buffer to buffer and relay control commands received from a host (not shown) to the control logic 512, and buffer and relay the state information received from the control logic 512 to the host. The interface 516 may also be coupled to the column decoder/bit line driver 506 via the data bus 518 and act as a data I/O interface and a data buffer to buffer and relay the data to and from the memory cell array 301.

Figure 6:
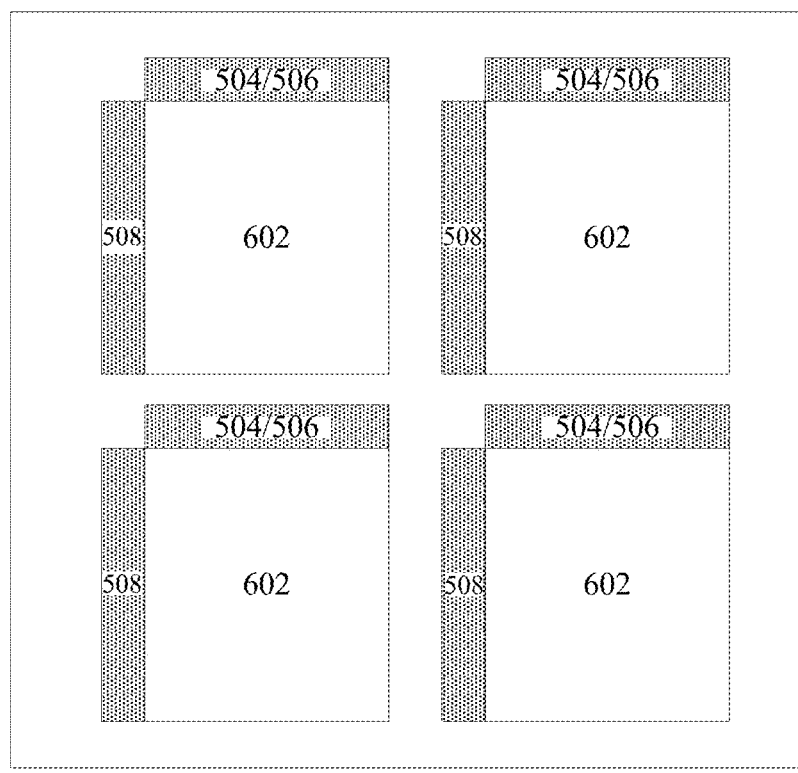
FIG. 6 shows a block diagram of an example memory device comprising a plurality of memory planes according to some aspects of the present disclosure.

FIG. 6 shows a block diagram of an example memory device 300 comprising a plurality of memory planes according to some aspects of the present disclosure. In some implementations, the memory device 300 comprises a plurality of memory planes 602 (e.g., 4 memory planes in FIG. 6). The memory planes 602 may be independent of each other when performing a read operation, a program operation, or an erase operation. For example, each memory plane 602 may be configured to independently perform the read operation in response to a read operation command received from the control logic 512. In some implementations, each memory plane 602 may parallelly process the operations, thereby increasing the operation speed. In order to enable each memory plane 602 to operate independently, memory cells comprised in each memory plane 602 are a portion of the memory cell array, and a page buffer corresponding to each memory plane 602 is a page buffer comprised in one of a plurality of page buffer circuits.

Figure 7:
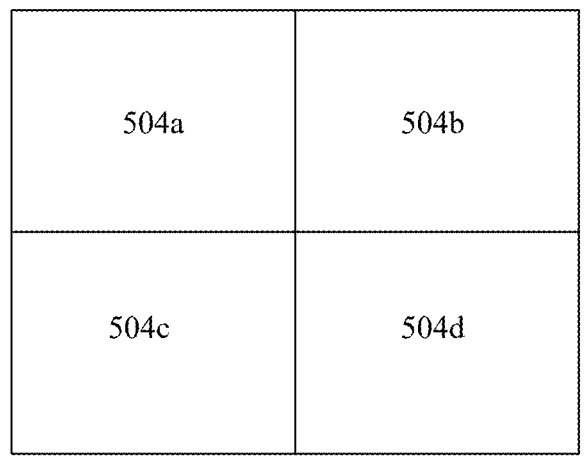
FIG. 7 shows an example layout of a memory plane comprising a plurality of page buffer groups according to some aspects of the present disclosure.

FIG. 7 shows an example layout of a memory plane comprising a plurality of page buffer groups according to some aspects of the present disclosure. The page buffer circuits corresponding to the memory planes are divided into a plurality of page buffer groups. According to some implementations, as shown in FIG. 7, a page buffer/sense amplifier circuit corresponding to the memory plane comprises four equal regions 504a, 504b, 504c, and 504d which are physically separated. For ease of description, the plurality of page buffer groups may be described as four quadri-division regions herein. It is to be noted that, the number of page buffer groups is not limited to four, and may be any integer (e.g., 2, 4, 8, 16, etc.) greater than 1, for example, eight octa-division regions. The page buffer/sense amplifier circuit corresponding to the memory plane may comprise the plurality of memory cells (e.g., latches, caches, or registers), so as to temporarily store (buffer) one or more pages of data to be read from or written to the memory cells in the memory plane. In some implementations, each of the quadri-division regions 504a, 504b, 504c, and 504d is same in size, i.e., a quarter of the page buffer/sense amplifier circuit corresponding to the memory plane. For example, the page buffer/sense amplifier circuit corresponding to the memory plane may store 16K bytes of data, and each of the quadri-division regions 504a, 504b, 504c, and 504d may store 4K bytes of data.

Some memory devices (e.g., NAND memory devices) may perform the read operation in pages, i.e., read all memory cells in a same selected page at the same time. The page buffer is configured to buffer read data between the memory cell array and the data bus in the read operation. Each of the plurality of page buffer groups of one memory plane has its own data path, and may be sequentially accessed in the read operation through its own data path. In some examples, the page buffer circuit corresponding to the memory plane may be divided into quadri-division, which respectively are page buffer groups Q0, Q1, Q2, and Q3, and each of the plurality of page buffer groups is sequentially selected in the buffer operation. That is to say, each of the four page buffer groups Q0, Q1, Q2, and Q3 sequentially receives a respective buffer operation command and performs the buffer operation. In some other examples, the page buffer circuit corresponding to the memory plane may be divided into octa-division, which respectively are page buffer groups Q01<0>, Q01<1>, Q01<2>, Q01<3>, Q23<0>, Q23<1>, Q23<2>, and Q23<3>. Each of the eight page buffer groups Q01<0>, Q01<1>, Q01<2>, Q01<3>, Q23<0>, Q23<1>, Q23<2>, and Q23<3> sequentially receives the respective buffer operation command and performs the buffer operation. In still further examples, the page buffer circuit corresponding to the memory plane may be divided into hexadeca-division, which respectively are page buffer groups Q0<0>, Q0<1>, Q0<2>, Q0<3>, Q1<0>, Q1<1>, Q1<2>, Q1<3>, Q2<0>, Q2<1>, Q2<2>, Q2<3>, Q3<0>, Q3<1>, Q3<2>, and Q3<3>. Each of the sixteen page buffer groups Q0<0>, Q0<1>, Q0<2>, Q0<3>, Q1<0>, Q1<1>, Q1<2>, Q1<3>, Q2<0>, Q2<1>, Q2<2>, Q2<3>, Q3<0>, Q3<1>, Q3<2>, and Q3<3> sequentially receives the respective buffer operation command and performs the buffer operation.

In the memory device, since the plurality of page buffer groups perform the buffer operation at the same time, a huge load current is generated in a short time, affecting the quality of power supply of the memory device, and thus reducing the reliability of the memory device. For example, during some operations of reading data from the memory cell of the memory plane in a memory array, data stored in the memory cell is temporarily stored in a latch of a page buffer coupled with the memory plane. During this read process, a high level current is drawn from a power management module. In this case, a voltage or current may exceed a current or power range provided by the power management module, affecting the quality of power supply of the memory device.

In this regard, performing time periods for the plurality of page buffer groups to perform the buffer operation may be staggered. As described above, in the case of quadri-dividion, four page buffer groups may be controlled to sequentially perform the buffer operation, and only one page buffer group (a quarter of the page buffer circuit) performs the buffer operation each time; in the case of octa-dividion, eight page buffer groups may be controlled to sequentially perform the buffer operation, and only one page buffer group (one eighth of the page buffer circuit) performs the buffer operation each time; and in the case of hexadeca-division, sixteen page buffer groups may be controlled to sequentially perform the buffer operation, and only one page buffer group (one sixteenth of the page buffer circuit) performs the buffer operation each time. Therefore, the load current can be reduced. However, this may cause an overall time to perform the buffer operation to be longer, thus reducing program/read efficiency.

Based on this, examples of the present disclosure provide another memory device and an operation method thereof. The memory device comprises: a memory cell array comprising a plurality of memory cells, wherein the plurality of memory cells are divided into a plurality of memory planes; a plurality of bit lines; a plurality of page buffer circuits, wherein each of the page buffer circuits comprises a plurality of page buffer groups, each of the page buffer circuits corresponds to one of the plurality of memory planes and is coupled through the bit line, and the page buffer circuit performs a buffer operation in response to a buffer operation command; and a control logic coupled to the plurality of page buffer groups and configured to: for each of the memory planes, provide the buffer operation command to the plurality of page buffer groups, and control performing time periods for the plurality of page buffer groups to perform the buffer operation such that some performing time periods among the plurality of performing time periods overlaps.

In some examples, the buffer operation comprises a program buffer operation and a read buffer operation, wherein the program buffer operation comprises storing program data to be written to the memory cell array to a corresponding page buffer, and the read buffer operation comprises storing data stored in the memory cell array to the corresponding page buffer.

A program operation may comprise an operation of programming, to the memory cell array, the program data that is stored in the page buffer through the program buffer operation and is to be written to the memory cell array.

A read operation may comprise an operation of transmitting the data stored in the memory cell array to a memory controller, wherein the data stored in the memory cell array is read from the memory cell array through the read buffer operation and stored in the page buffer.

It is to be noted that, the memory device in the examples of the present disclosure comprises the plurality of memory planes, operations of respective memory plane are independent, and the operations of various memory planes may be performed in parallel. One memory plane is used as an example for description. When the program operation/read operation is performed on the memory plane, all the page buffer groups comprised in the page buffer circuit corresponding to the memory plane are traversed, i.e., all the page buffer groups comprised in the page buffer circuit corresponding to the memory plane would perform the buffer operation. For example, when the page buffer circuit corresponding to the memory plane is divided into octa-division, eight buffer groups of the memory plane would all be traversed.

In the examples of the present disclosure, by controlling the performing time periods of the plurality of page buffer groups, some performing time periods among the plurality of performing time periods overlaps, such that the impact on program/read times can be reduced while the quality of power supply is improved compared to a solution in which there is no overlap among the plurality of performing time periods.

In some examples, the control logic is further configured to: for each of the memory planes, provide the buffer operation command to the plurality of page buffer groups, and control the performing time periods for the plurality of page buffer groups to perform the buffer operation such that a performing time period of the first started page buffer group does not overlap with performing time periods of other page buffer groups.

In the examples of the present disclosure, the page buffer is a load of the power management module, and the current generated by the page buffer is the load current. An output load current of the power management module tends to change abruptly with a working state of the circuit. When the output load current of the power management module jumps from a light load to a heavy load, i.e., when the load current increases abruptly, the power management module is unable to respond immediately following an abrupt increase in the load current, such that a sufficient current is unable to be outputted, in this case, a part of the current (to maintain VDD) is provided by an output load capacitance of the power management module, and there would be a downward spike in an output voltage (VDD) of the power management module, i.e., the output voltage Vout is pulled down, and the output voltage would gradual recover after the power management module responds to the abrupt increase in the load current, i.e., the output voltage being pulled down is recovered. When the output load current of the power management module jumps from a heavy load to a light load, i.e., when the load current drops abruptly, the power management module is unable to respond immediately following an abrupt drop in the load current, such that excess currents are outputted, in this case, a part of the current would flow to the output load capacitance, and there would be an upward spike in the output voltage, i.e., the output voltage is pulled up, and then would gradual recover after the power management module responds to the abrupt drop in the load current, i.e., the output voltage being pulled up is recovered. A response time for the power management module to respond to an abrupt change in the load current is generally about 40 ns.

In the examples of the present disclosure, when the program operation/read operation is performed on the memory plane, by controlling the performing time periods of the plurality of page buffer groups, the performing time period of the first started page buffer group does not overlap with the performing time periods of other page buffer groups. Thus, at the beginning of the buffer operation, only one page buffer group performs the buffer operation, so as to avoid the abrupt increase in the load current caused by the plurality of page buffer groups performing the buffer operation at the same time. Therefore, the impact on program/read times is reduced while the quality of power supply is improved.

Figure 8A:
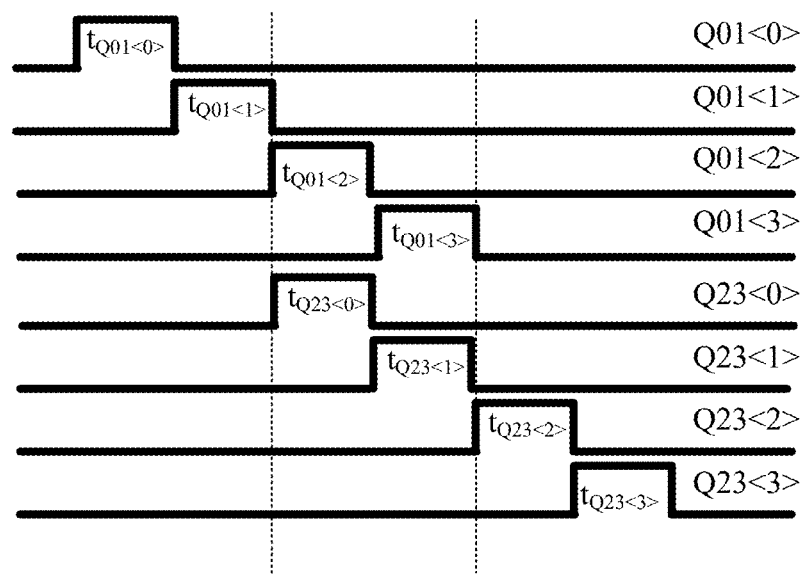
FIG. 8A shows a schematic timing diagram I of different page buffer groups in a process of performing a buffer operation according to an example of the present disclosure.
Figure 8B:
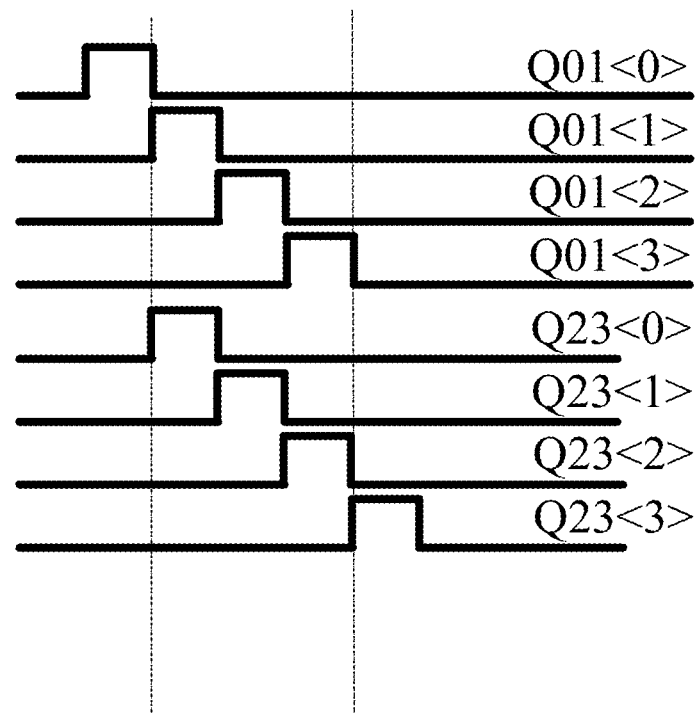
FIG. 8B shows a schematic timing diagram II of different page buffer groups in a process of performing a buffer operation according to an example of the present disclosure.

FIG. 8A is a schematic timing diagram I of different page buffer groups in a process of performing a buffer operation in an example of the present disclosure; FIG. 8B is a schematic timing diagram II of different page buffer groups in a process of performing a buffer operation in an example of the present disclosure; and it is to be noted that, FIGS. 8A and 8B are described by using an example that the page buffer circuit corresponding to the memory plane is divided into eight page buffer groups. As shown in FIGS. 8A and 8B, performing time periods for the eight page buffer groups Q01<0>, Q01<1>, Q01<2>, Q01<3>, Q23<0>, Q23<1>, Q23<2>, and Q23<3> to correspondingly perform the buffer operation are $t_{Q01<0>}$, $t_{Q01<1>}$, $t_{Q01<2>}$, $t_{Q01<3>}$, $t_{Q23<0>}$, $t_{Q23<1>}$, $t_{Q23<2>}$, and $t_{Q23<3>}$, respectively. The performing time period $t_{Q01<0>}$ of the first started page buffer group Q01<0> does not overlap with the performing time periods of other page buffer groups. Herein, a duration corresponding to the performing time period of each buffer group is the same; and the duration corresponding to the performing time period of each buffer group is T1.

Figure 9A:
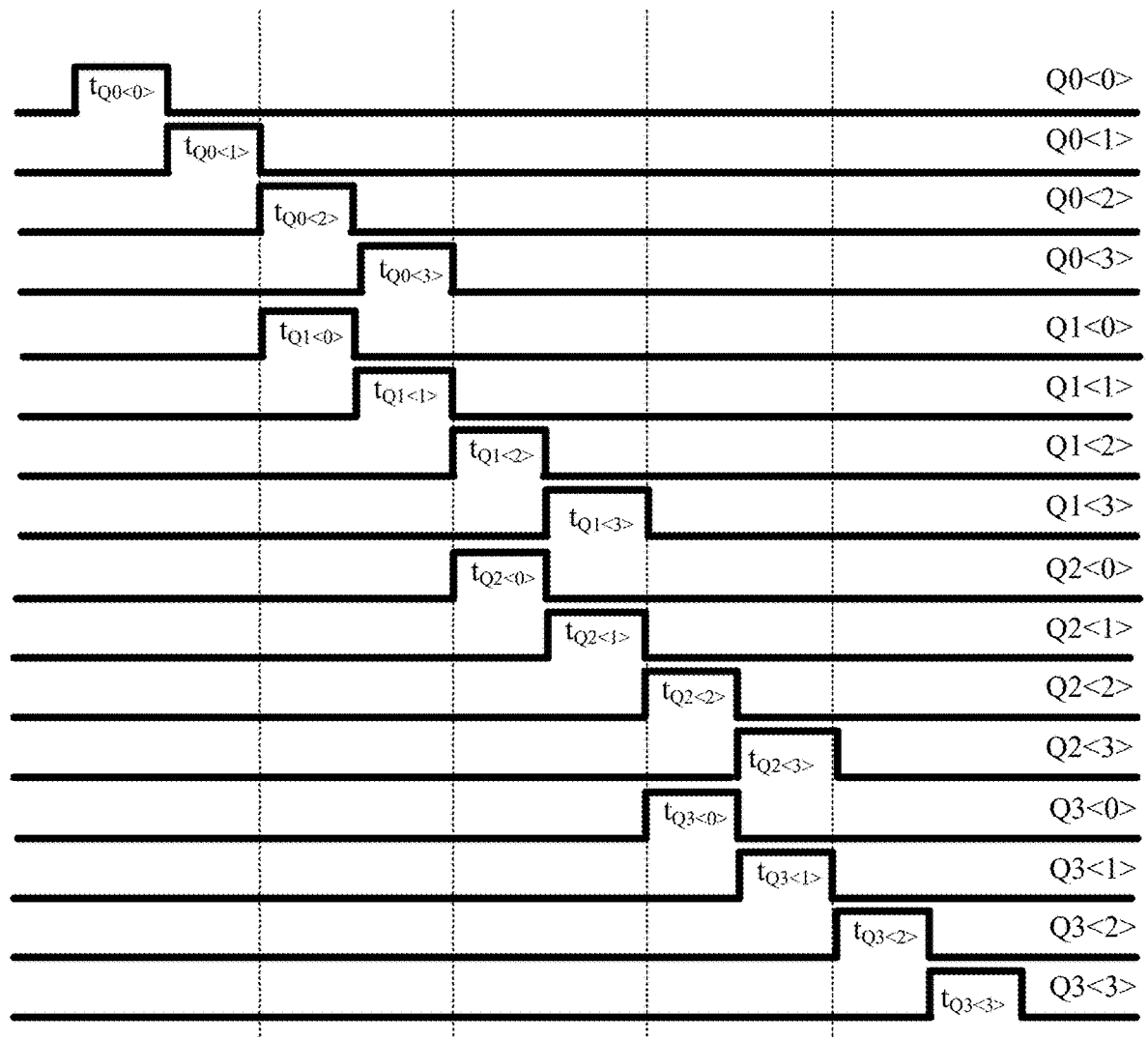
FIG. 9A shows a schematic timing diagram III of different page buffer groups in a process of performing a buffer operation according to an example of the present disclosure.
Figure 9B:
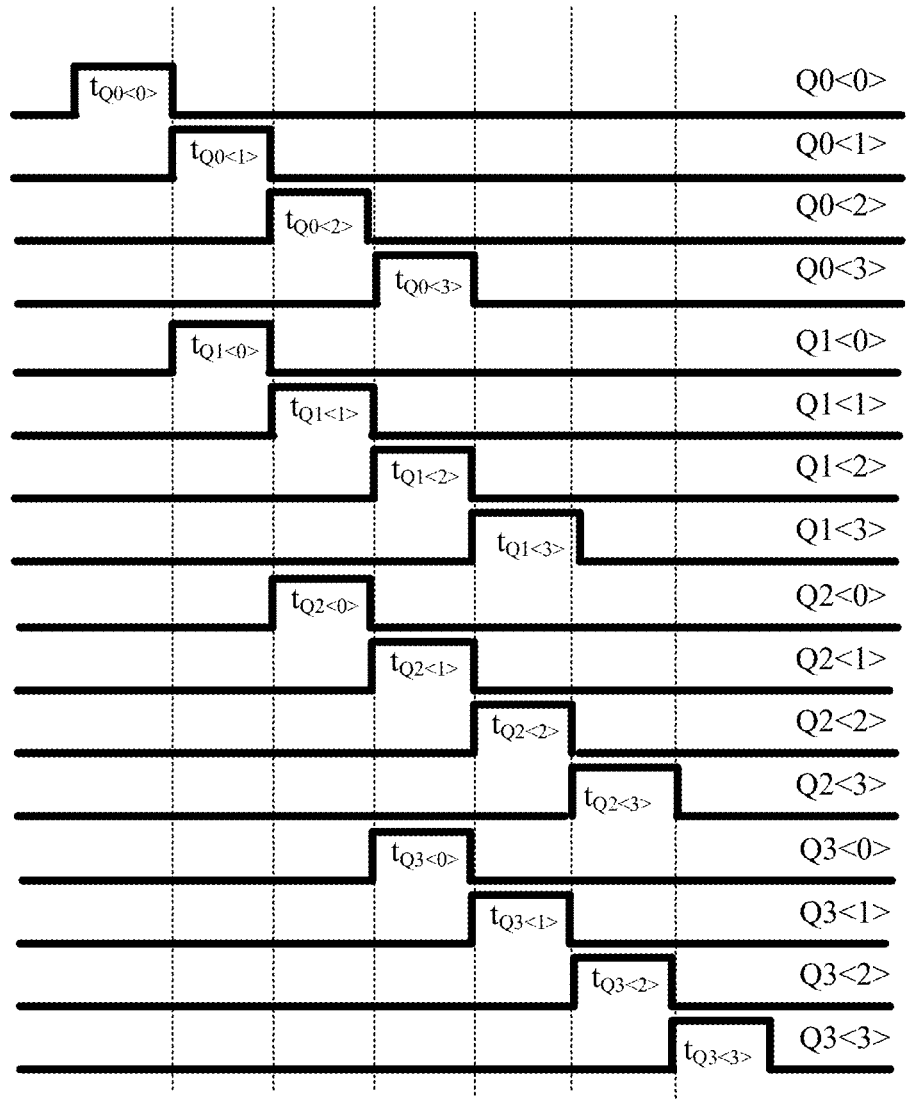
FIG. 9B shows a schematic timing diagram IV of different page buffer groups in a process of performing a buffer operation according to an example of the present disclosure.

FIG. 9A is a schematic timing diagram III of different page buffer groups in a process of performing a buffer operation in an example of the present disclosure; FIG. 9B is a schematic timing diagram IV of different page buffer groups in a process of performing a buffer operation in an example of the present disclosure; and it is to be noted that, FIGS. 9A and 9B are described by using an example that the page buffer circuit corresponding to the memory plane is divided into sixteen page buffer groups. As shown in FIGS. 9A and 9B, performing time periods for the sixteen page buffer groups Q0<0>, Q0<1>, Q0<2>, Q0<3>, Q1<0>, Q1<1>, Q1<2>, Q1<3>, Q2<0>, Q2<1>, Q2<2>, Q2<3>, Q3<0>, Q3<1>, Q3<2>, and Q3<3> to correspondingly perform the buffer operation are $t_{Q0<0>}$, $t_{Q0<1>}$, $t_{Q0<2>}$, $t_{Q0<3>}$, $t_{Q1<0>}$, $t_{Q1<1>}$, $t_{Q1<2>}$, $t_{Q1<3>}$, $t_{Q2<0>}$, $t_{Q2<1>}$, $t_{Q2<2>}$, $t_{Q2<3>}$, $t_{Q3<0>}$, $t_{Q3<1>}$, $t_{Q3<2>}$ and $t_{Q3<3>}$, respectively. The performing time period $t_{Q0<0>}$ of the first started page buffer group Q0<0> the does not overlap with the performing time periods of other page buffer groups. Herein, a duration corresponding to the performing time period of each buffer group is the same; and the duration corresponding to the performing time period of each buffer group is T2.

In some other examples, the control logic is further configured to: for each of the memory planes, provide the buffer operation command to the plurality of page buffer groups, and control the performing time periods for the plurality of page buffer groups to perform the buffer operation such that performing time periods of the first two started page buffer groups do not overlap with the performing time periods of other page buffer groups.

As shown in FIG. 8A, the performing time periods $t_{Q0<0>}$ and $t_{Q0<1>}$ of the first two started page buffer groups Q01<0> and Q01<1> do not overlap with the performing time periods of other page buffer groups.

As shown in FIG. 9A, the performing time periods $t_{Q0<0>}$ and $t_{Q0<1>}$ of the first two started page buffer groups Q0<0> and Q0<1> do not overlap with the performing time periods of other page buffer groups.

In some examples, the duration corresponding to the performing time period for each page buffer group to perform the buffer operation may be 20 ns or 40 ns. When the duration corresponding to the performing time period for each page buffer group to perform the buffer operation is 20 ns, the control logic is configured to: for each of the memory planes, provide the buffer operation command to the plurality of page buffer groups, and control the performing time periods for the plurality of page buffer groups to perform the buffer operation such that the performing time periods of the first two started page buffer groups do not overlap with the performing time periods of other page buffer groups. Therefore, within the response time of the power management module, only one page buffer group performs the buffer operation, so as to avoid a situation where the output voltage is pulled up. When the duration corresponding to the performing time period for each page buffer group to perform the buffer operation is 40 ns, the control logic is configured to: for each of the memory planes, provide the buffer operation command to the plurality of page buffer groups, and control the performing time periods for the plurality of page buffer groups to perform the buffer operation such that the performing time period of the first started page buffer group does not overlap with the performing time periods of other page buffer groups. Therefore, within the response time of the power management module, only one page buffer group performs the buffer operation, so as to avoid a situation where the output voltage is pulled up.

In some examples, the control logic is further configured to: provide the buffer operation command to the plurality of page buffer groups, and control the performing time periods for the plurality of page buffer groups to perform the buffer operation such that a performing time period of the last started page buffer group does not overlap with the performing time periods of other page buffer groups.

In the examples of the present disclosure, when the program operation/read operation is performed on the memory plane, by controlling the performing time periods of the plurality of page buffer groups, the performing time period of the last started page buffer group does not overlap with the performing time periods of other page buffer groups. Thus, at the end of the buffer operation, only one page buffer group performs the buffer operation, so as to avoid the abrupt drop in the load current caused by the plurality of page buffer groups exiting the buffer operation at the same time. Therefore, the impact on program/read times is reduced while the quality of power supply is improved. It is to be noted that, the above-mentioned "the plurality of page buffer groups exiting the buffer operation at the same time" corresponds to the plurality of page buffer groups performing the buffer operation at the same time. It can be understood that, due to differences in circuits, even if the plurality of page buffer groups perform the buffer operation at the same time, the timing they exit the buffer operation are not strictly "simultaneous".

As shown in FIGS. 8A and 8B, the performing time period $t_{Q3<3>}$ of the last started page buffer group Q3<3> does not overlap with the performing time periods of other page buffer groups.

As shown in FIGS. 9A and 9B, the performing time period $t_{Q3<3>}$ of the last started page buffer group Q3<3> does not overlap with the performing time periods of other page buffer groups.

In some other examples, the control logic is further configured to: for each of the memory planes, provide the buffer operation command to the plurality of page buffer groups, and control the performing time periods for the plurality of page buffer groups to perform the buffer operation such that performing time periods of the last two started page buffer groups do not overlap with the performing time periods of other page buffer groups.

As shown in FIG. 8A, the performing time periods $t_{Q23<2>}$ and $t_{Q23<3>}$ of the last two started page buffer groups Q23<2> and Q23<3> do not overlap with the performing time periods of other page buffer groups.

As shown in FIG. 9A, the performing time periods $t_{Q3<2>}$ and $t_{Q3<3>}$ of the last two started page buffer groups Q3<2> and Q3<3> do not overlap with the performing time periods of other page buffer groups.

In some examples, when the duration corresponding to the performing time period for each page buffer group to perform the buffer operation is 20 ns, the control logic is configured to: for each of the memory planes, provide the buffer operation command to the plurality of page buffer groups, and control the performing time periods for the plurality of page buffer groups to perform the buffer operation such that the performing time periods of the last two started page buffer groups do not overlap with the performing time periods of other page buffer groups. Therefore, within the response time of the power management module, only one page buffer group performs the buffer operation, so as to avoid the abrupt drop in the load current caused by the plurality of page buffer groups exiting the buffer operation at the same time. When the duration corresponding to the performing time period for each page buffer group to perform the buffer operation is 40 ns, the control logic is configured to: for each of the memory planes, provide the buffer operation command to the plurality of page buffer groups, and control the performing time periods for the plurality of page buffer groups to perform the buffer operation such that the performing time period of the last started page buffer group does not overlap with the performing time periods of other page buffer groups. Therefore, within the response time of the power management module, only one page buffer group performs the buffer operation, so as to avoid the abrupt drop in the load current caused by the plurality of page buffer groups exiting the buffer operation at the same time.

In some examples, the control logic is further configured to: for each of the memory planes, provide the buffer operation command to the plurality of page buffer groups, and control the performing time periods for the plurality of page buffer groups to perform the buffer operation such that the performing time periods of at least two page buffer groups among the page buffer groups other than the first and last started page buffer groups overlap completely.

As shown in FIG. 8B, the performing time periods of at least two page buffer groups among the page buffer groups other than the first started page buffer group Q01<0> and the last started page buffer group Q23<3> overlap completely. For example, the performing time periods of the page buffer group Q01<1> and the page buffer group Q23<0> overlap completely; the performing time periods of the page buffer group Q01<2> and the page buffer group Q23<1> overlap completely; and the performing time periods of the page buffer group Q01<3> and the page buffer group Q23<2> overlap completely.

As shown in FIG. 9B, the performing time periods of at least two page buffer groups among the page buffer groups other than the first started page buffer group Q0<0> and the last started page buffer group Q3<3> overlap completely. For example, the performing time periods of the page buffer group Q0<1> and the page buffer group Q1<0> overlap completely; the performing time periods of the page buffer group Q0<2>, the page buffer group Q1<1>, and the page buffer group Q2<0> overlap completely; the performing time periods of the page buffer group Q0<3>, the page buffer group Q1<2>, the page buffer group Q2<1>, and the page buffer group Q3<0> overlap completely; the performing time periods of the page buffer group Q1<3>, the page buffer group Q2<2>, and the page buffer group Q3<1> overlap completely; and the performing time periods of the page buffer group Q2<3> and the page buffer group Q3<2> overlap completely.

In some other examples, the control logic is further configured to: for each of the memory planes, provide the buffer operation command to the plurality of page buffer groups, and control the performing time periods for the plurality of page buffer groups to perform the buffer operation such that the performing time periods of at least two page buffer groups among the page buffer groups other than the first two started page buffer groups and the last two started page buffer groups overlap completely.

As shown in FIG. 8A, the performing time periods of at least two page buffer groups among the page buffer groups other than the first two started page buffer groups Q01<0> and Q01<1> and the last two started page buffer groups Q23<2> and Q23<3> overlap completely. For example, the performing time periods of the page buffer group Q01<2> and the page buffer group Q23<0> overlap completely; and the performing time periods of the page buffer group Q01<3> and the page buffer group Q23<1> overlap completely.

As shown in FIG. 9A, the performing time periods of at least two page buffer groups among the page buffer groups other than the first two started page buffer groups Q0<0> and Q0<1> and the last two started page buffer groups Q3<2> and Q3<3> overlap completely. For example, the performing time periods of the page buffer group Q0<2> and the page buffer group Q1<0> overlap completely; the performing time periods of the page buffer group Q0<3> and the page buffer group Q1<1> overlap completely; the performing time periods of the page buffer group Q1<2> and the page buffer group Q2<0> overlap completely; the performing time periods of the page buffer group Q1<3> and the page buffer group Q2<1> overlap completely; the performing time periods of the page buffer group Q2<2> and the page buffer group Q3<0> overlap completely; and the performing time periods of the page buffer group Q2<3> and the page buffer group Q3<1> overlap completely.

In some examples, the control logic is further configured to: for each of the memory planes, divide the plurality of page buffer groups into a plurality of load groups, and provide the buffer operation command to the plurality of page buffer groups such that the performing time periods of various page buffer groups in each load group do not overlap.

As shown in FIGS. 8A and 8B, 4 page buffer groups Q01<0>, Q01<1>, Q01<2>, and Q01<3> are a first load group; 4 page buffer groups Q23<0>, Q23<1>, Q23<2>, and Q23<3> are a second load group; and the performing time periods of various page buffer groups in each of the first load group and the second load group do not overlap.

As shown in FIGS. 9A and 9B, 4 page buffer groups Q0<0>, Q0<1>, Q0<2>, and Q0<3> are a first load group; 4 page buffer groups Q1<0>, Q1<1>, Q1<2>, and Q1<3> are a second load group; 4 page buffer groups Q2<0>, Q2<1>, Q2<2>, and Q2<3> are a third load group; 4 page buffer groups Q3<0>, Q3<1>, Q3<2>, and Q3<3> are a fourth load group; and the performing time periods of various page buffer groups in each of the first load group, the second load group, the third load group, and the fourth load group do not overlap.

In some examples, the control logic is further configured to: for each of the memory planes, divide the plurality of page buffer groups into a plurality of load groups, and provide the buffer operation command to a plurality of page buffers such that there is a first predetermined time interval between performing time periods of two load groups started successively.

As shown in FIG. 8A, the performing time periods $t_{Q01<0>}$, $t_{Q01<1>}$, $t_{Q01<2>}$, and $t_{Q01<3>}$ of the 4 page buffer groups Q01<0>, Q01<1>, Q01<2>, and Q01<3> of the first load group together constitute a performing time period of the first load group; and the performing time periods $t_{Q23<0>}$, $t_{Q23<1>}$, $t_{Q23<2>}$, and $t_{Q23<3>}$ of the 4 page buffer groups Q23<0>, Q23<1>, Q23<2>, and Q23<3> of the second load group together constitute a performing time period of the second load group. There is a first predetermined time interval between the performing time periods of the two load groups started successively, for example, there is a first predetermined time interval between the performing time periods of the first load group and the second load group. Herein, the first predetermined time interval is 2×T1.

As shown in FIG. 8B, there is a first predetermined time interval between the performing time periods of the two load groups started successively, for example, there is a first predetermined time interval between the performing time periods of the first load group and the second load group. Herein, the first predetermined time interval is T1.

As shown in FIG. 9A, the performing time periods $t_{Q0<0>}$, $t_{Q0<1>}$, $t_{Q0<2>}$, and $t_{Q0<3>}$ of the 4 page buffer groups Q0<0>, Q0<1>, Q0<2>, and Q0<3> of the first load group together constitute a performing time period of the first load group; the performing time periods $t_{Q1<0>}$, $t_{Q1<1>}$, $t_{Q1<2>}$ and $t_{Q1<3>}$ of the 4 page buffer groups Q1<0>, Q1<1>, Q1<2>, and Q1<3> of the second load group together constitute a performing time period of the second load group; the performing time periods $t_{Q2<0>}$, $t_{Q2<1>}$, $t_{Q2<2>}$ and $t_{Q2<3>}$ of the 4 page buffer groups Q2<0>, Q2<1>, Q2<2>, and Q2<3> of the third load group together constitute a performing time period of the third load group; and the performing time periods $t_{Q3<0>}$, $t_{Q3<1>}$, $t_{Q3<2>}$ and $t_{Q3<3>}$ of the 4 page buffer groups Q3<0>, Q3<1>, Q3<2>, and Q3<3> of the fourth load group together constitute a performing time period of the fourth load group. There is a first predetermined time interval between the performing time periods of the two load groups started successively, for example, there is a first predetermined time interval between the performing time periods of the first load group and the second load group; there is a first predetermined time interval between the performing time periods of the second load group and the third load group; and there is a first predetermined time interval between the performing time periods of the third load group and the fourth load group. Herein, the first predetermined time interval is 2×T2.

As shown in FIG. 9B, there is a first predetermined time interval between the performing time periods of the two load groups started successively, for example, there is a first predetermined time interval between the performing time periods of the first load group and the second load group; there is a first predetermined time interval between the performing time periods of the second load group and the third load group; and there is a first predetermined time interval between the performing time periods of the third load group and the fourth load group. Herein, the first predetermined time interval is T2.

In some examples, the memory device further comprises a page buffer management circuit. The page buffer management circuit comprises: a signal generation module configured to generate an initial start signal; and a delay module comprising M delay cells connected in series, wherein each of the delay cells is configured to generate a delay start signal having a second predetermined time interval from the initial start signal. Herein, the page buffer management circuit belongs to a peripheral circuit.

In some examples, the delay cell is a flip-flop; the delay module comprises M flip-flops connected in series; the M flip-flops connected in series constitute a M stage flip-flop; clock ends of the M flip-flops receive a same clock signal; an output Q port of a previous stage flip-flop in the M stage flip-flop and an input D port of an next stage flip-flop are cascaded, wherein an input D port of a first stage flip-flop receives an initial start signal, and an output Q port of the first stage flip-flop outputs a first start signal delayed by 1 clock period; and an output Q port of the Mth stage flip-flop outputs an Mth start signal delayed by M clock periods.

Figure 10:
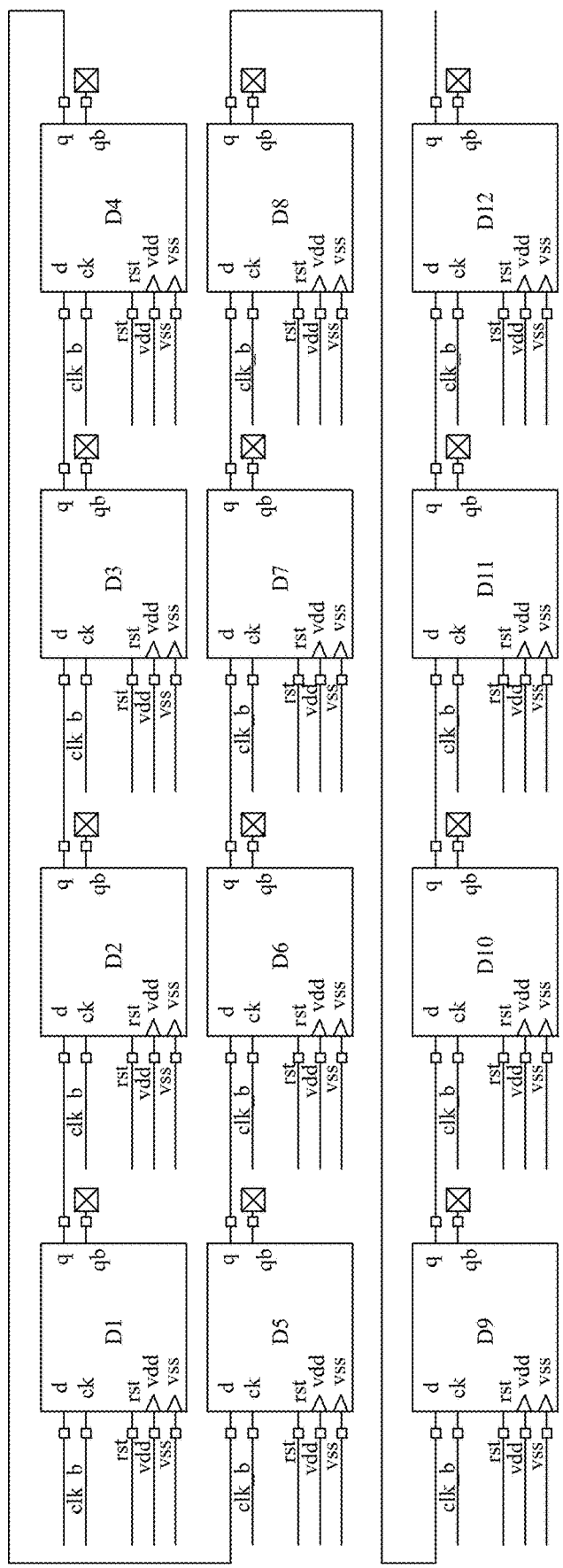
FIG. 10 shows a schematic diagram of a delay module according to some examples of the present disclosure.

FIG. 10 shows a schematic diagram of a delay module according to some examples of the present disclosure. As shown in FIG. 10, the delay module comprises 12 flip-flops connected in series, and each flip-flop comprises four ports, which respectively are a clock port Clk, an input d port, an output q port, and a reset port. The output q ports and the input d ports of the 12 flip-flops are cascaded. An input d port of a first stage flip-flop D1 receives an initial start signal, and an output Q port of the first stage flip-flop D1 outputs a first start signal delayed by 1 clock period; an output Q port of a second stage flip-flop D2 outputs a second start signal delayed by 2 clock periods; an output Q port of a third stage flip-flop D3 outputs a third start signal delayed by 3 clock periods; an output Q port of a fourth stage flip-flop D4 outputs a fourth start signal delayed by 4 clock periods; an output Q port of a fifth stage flip-flop D5 outputs a fifth start signal delayed by 5 clock periods; an output Q port of a sixth stage flip-flop D6 outputs a sixth start signal delayed by 6 clock periods; an output Q port of a seventh stage flip-flop D7 outputs a seventh start signal delayed by 7 clock periods; an output Q port of an eighth stage flip-flop D8 outputs an eighth start signal delayed by 8 clock periods; an output Q port of a ninth stage flip-flop D9 outputs a ninth start signal delayed by 9 clock periods; an output Q port of a tenth stage flip-flop D10 outputs a tenth start signal delayed by 10 clock periods; an output Q port of an eleventh stage flip-flop D11 outputs an eleventh start signal delayed by 11 clock periods; and an output Q port of a twelfth stage flip-flop outputs a twelfth start signal delayed by 12 clock periods.

In an example, taking the page buffer circuit corresponding to the memory plane being divided into sixteen page buffer groups as an example; delay between the second load group and the first load group may comprise 1 clock period, 2 clock periods, 3 clock periods, and 4 clock periods; delay between the third load group and the first load group may comprise 2 clock periods, 4 clock periods, 6 clock periods, and 8 clock periods; and delay between the fourth load group and the first load group may comprise 3 clock periods, 6 clock periods, 9 clock periods, and 12 clock periods. Therefore, respective flip-flop outputs may be selected based on required delay clock periods.

In an example, taking the page buffer circuit corresponding to the memory plane being divided into eight page buffer groups as an example; the delay between the second load group and the first load group may comprise 1 clock period, 2 clock periods, 3 clock periods, and 4 clock periods. Therefore, the respective flip-flop outputs may be selected based on the required delay clock periods.

In some examples, the second predetermined time interval is X clock periods, X is an integer greater than or equal to 1 and less than or equal to 12, and M is an integer greater than or equal to (X+1).

Herein, when the page buffer circuit corresponding to the memory plane is divided into eight page buffer groups, a duration corresponding to the clock period is T1. When the page buffer circuit corresponding to the memory plane is divided into sixteen page buffer groups, the duration corresponding to the clock period is T2.

In some examples, the memory device further comprises a page buffer management circuit. The page buffer management circuit comprises: a one-out-of-N multiplexer group, wherein the one-out-of-N multiplexer group is configured to select one of N clock periods as the first predetermined time interval, and N is an integer greater than or equal to 2.

Figure 11:
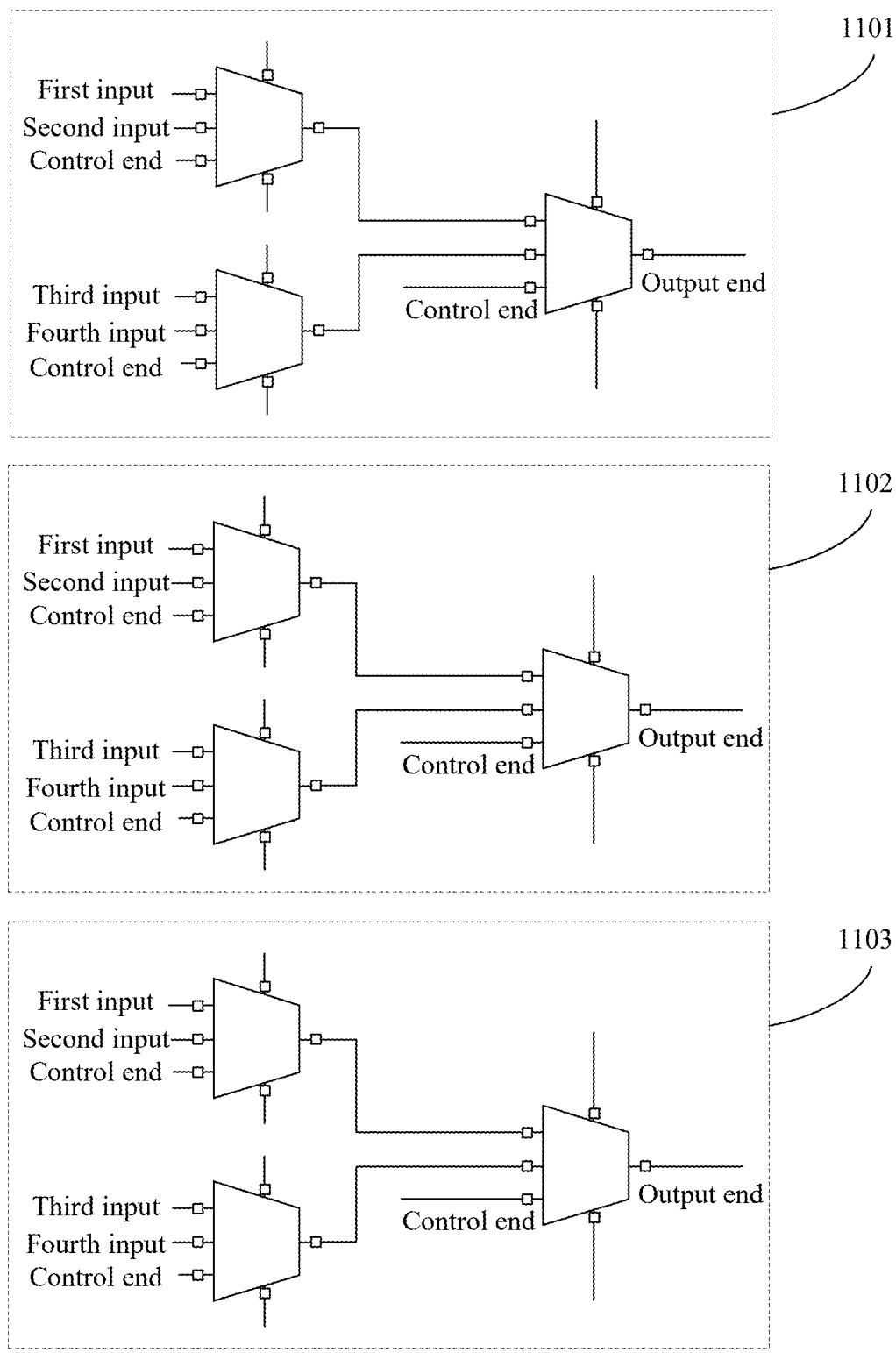
FIG. 11 shows a schematic diagram of a one-out-of-N multiplexer group according to some examples of the present disclosure.

FIG. 11 shows a schematic diagram of a one-out-of-N multiplexer group according to some examples of the present disclosure. As shown in FIG. 11, the one-out-of-N multiplexer group may comprise 3 one-out-of-four multiplexers, which respectively are a one-out-of-four multiplexer 1101, a one-out-of-four multiplexer 1102, and a one-out-of-four multiplexer 1103. Each one-out-of-four multiplexer may be constituted by 3 one-out-of-two multiplexers. Each one-out-of-four multiplexer comprises four input ends, one output end, and a control end, and a signal inputted by the control end selects one of input signals from the four input ends as an output. It is to be noted that, in the case that the one-out-of-four multiplexer is constituted by 3 one-out-of-two multiplexers, each one-out-of-two multiplexer comprises two input ends, one output end, and one control end. In an example, taking the page buffer circuit corresponding to the memory plane being divided into sixteen page buffer groups as an example, the one-out-of-four multiplexer 1101 corresponds to the second load group, and since the delay between the second load group and the first load group may comprise 1 clock period, 2 clock periods, 3 clock periods, and 4 clock periods, four inputs of the one-out-of-four multiplexer 1101 respectively are outputs of a first stage flip-flop D1, a second stage flip-flop D2, a third stage flip-flop D3, and a fourth stage flip-flop D4; the one-out-of-four multiplexer 1102 corresponds to the third load group, and since the delay between the third load group and the first load group may comprise 2 clock periods, 4 clock periods, 6 clock periods, and 8 clock periods, four inputs of the one-out-of-four multiplexer 1102 respectively are outputs of the second stage flip-flop D2, the fourth stage flip-flop D4, a sixth stage flip-flop D6, and an eighth stage flip-flop D8; and the one-out-of-four multiplexer 1103 corresponds to the fourth load group, and since the delay between the fourth load group and the first load group may comprise 3 clock periods, 6 clock periods, 9 clock periods, and 12 clock periods, four inputs of the one-out-of-four multiplexer 1103 respectively are outputs of the third stage flip-flop D3, the sixth stage flip-flop D6, a ninth stage flip-flop D9, and a twelfth stage flip-flop D12.

In an example, taking the page buffer circuit corresponding to the memory plane being divided into eight page buffer groups as an example; the one-out-of-four multiplexer 1101 corresponds to the second load group, and since the delay between the second load group and the first load group may comprise 1 clock period, 2 clock periods, 3 clock periods, and 4 clock periods, the four inputs of the one-out-of-four multiplexer 1101 respectively are the outputs of the first stage flip-flop D1, the second stage flip-flop D2, the third stage flip-flop D3, and the fourth stage flip-flop D4.

In some examples, taking the page buffer circuit corresponding to the memory plane being divided into sixteen page buffer groups as an example, since there is a first predetermined time interval between the performing time periods of the two load groups started successively, delay times between the first load group and the second load group, between the second load group and the third load group, and between the third load group and the fourth load group are fixed. Therefore, options of the 3 one-out-of-four multiplexers are also fixed, for example, the one-out-of-four multiplexer 1101, the one-out-of-four multiplexer 1102, and the one-out-of-four multiplexer 1103 all select the first inputs (respectively being the outputs of the first stage flip-flop D1, second stage flip-flop D2, and third stage flip-flop D3) as outputs; the one-out-of-four multiplexer 1101, the one-out-of-four multiplexer 1102, and the one-out-of-four multiplexer 1103 all select the second inputs (respectively being the outputs of the second stage flip-flop D2, fourth stage flip-flop D4, and sixth stage flip-flop D6) as outputs; the one-out-of-four multiplexer 1101, the one-out-of-four multiplexer 1102, and the one-out-of-four multiplexer 1103 all select the third inputs (respectively being the outputs of the third stage flip-flop D3, sixth stage flip-flop D6, and ninth stage flip-flop D9) as outputs; and the one-out-of-four multiplexer 1101, the one-out-of-four multiplexer 1102, and the one-out-of-four multiplexer 1103 all select the fourth inputs (respectively being the outputs of the fourth stage flip-flop D4, eighth stage flip-flop D8, and twelfth stage flip-flop D12) as outputs.

| Control end | First predetermined time interval | Time consumption for octa-division | Time consumption for hexadeca-division |
| --- | --- | --- | --- |
| 00 | 4 clock periods | 8T1 | 16T2 |
| 01 | 3 clock periods | 7T1 | 13T2 |
| 10 | 2 clock periods | 6T1 | 10T2 |
| 11 | 1 clock period | 5T1 | 7T2 |

From the above table, it can be learned that in the case of octa-division, i.e., when the page buffer circuit corresponding to the memory plane is divided into eight page buffer groups, based on the signal of the control end of the one-out-of-four multiplexer, whether the delay between the first load group and the second load group can be controlled to be 1 clock period, 2 clock periods, 3 clock periods, or 4 clock periods. In the case that the delay between the first load group and the second load group is 4 clock periods, a time consumed for the page buffer circuit to perform the buffer operation is 8T1; in the case that the delay between the first load group and the second load group is 3 clock periods, the time consumed for the page buffer circuit to perform the buffer operation is 7T1; in the case that the delay between the first load group and the second load group is 2 clock periods, the time consumed for the page buffer circuit to perform the buffer operation is 6T1 (as shown in FIG. 8A); and in the case that the delay between the first load group and the second load group is 1 clock period, the time consumed for the page buffer circuit to perform the buffer operation is 5T1 (as shown in FIG. 8B). In the case of hexadeca-division, i.e., in the case that the page buffer circuit corresponding to the memory plane is divided into sixteen page buffer groups, based on the signal of the control end of the one-out-of-four multiplexer, whether the delay between the two load groups that are started successively can be controlled to be 1 clock period, 2 clock periods, 3 clock periods, or 4 clock periods. In the case that the delay between the two load groups that are started successively is 4 clock periods, the time consumed for the page buffer circuit to perform the buffer operation is 16T2; in the case that the delay between the two load groups that are started successively is 3 clock periods, the time consumed for the page buffer circuit to perform the buffer operation is 13T2; in the case that the delay between the two load groups started successively is 2 clock periods, the time consumed for the page buffer circuit to perform the buffer operation is 10T2 (as shown in FIG. 9A); and in the case that the delay between the two load groups that are started successively is 1 clock period, the time consumed for the page buffer circuit to perform the buffer operation is 7T2 (as shown in FIG. 9B).

The examples of the present disclosure provide a memory device and an operation method thereof, and a memory system. The memory device comprises: a memory cell array comprising a plurality of memory cells, wherein the plurality of memory cells are divided into a plurality of memory planes; a plurality of bit lines; a plurality of page buffer circuits, wherein each of the page buffer circuits comprises a plurality of page buffer groups, each of the page buffer circuits corresponds to one of the plurality of memory planes and is coupled through the bit line, and the page buffer circuit performs the buffer operation in response to the buffer operation command; and the control logic coupled to the plurality of page buffer groups and configured to: for each of the memory planes, provide the buffer operation command to the plurality of page buffer groups, and control performing time periods for the plurality of page buffer groups to perform the buffer operation such that some performing time periods among the plurality of performing time periods overlaps. In the examples of the present disclosure, by controlling the performing time periods of the plurality of page buffer groups, some performing time periods among the plurality of performing time periods overlaps, such that the impact on program/read times can be reduced while the quality of power supply is improved compared to a solution that there is no overlap among the plurality of performing time periods.

Based on the above-mentioned memory device, examples of the present disclosure further provide an operation method of a memory device, wherein the memory device comprises: a memory cell array comprising a plurality of memory cells, wherein the plurality of memory cells are divided into a plurality of memory planes; and a plurality of page buffer circuits, wherein each of the page buffer circuits comprises a plurality of page buffer groups, each page buffer circuit corresponds to one of the plurality of memory planes. As shown in FIG. 12, the operation method comprises:

operation 1200: for each of the memory planes, providing the buffer operation command to the plurality of page buffer groups, and controlling performing time periods for the plurality of page buffer groups to perform the buffer operation such that some performing time periods among the plurality of performing time periods overlaps.

In some examples, providing the buffer operation command to the plurality of page buffer groups, and controlling the performing time periods for the plurality of page buffer groups to perform the buffer operation such that some performing time periods among the plurality of performing time periods overlaps comprises: for each of the memory planes, providing the buffer operation command to the plurality of page buffer groups, and controlling the performing time periods for the plurality of page buffer groups to perform the buffer operation such that a performing time period of the first started page buffer group does not overlap with performing time periods of other page buffer groups.

In some examples, providing the buffer operation command to the plurality of page buffer groups, and controlling the performing time periods for the plurality of page buffer groups to perform the buffer operation such that some performing time periods among the plurality of performing time periods overlaps comprises: for each of the memory planes, providing the buffer operation command to the plurality of page buffer groups, and controlling the performing time periods for the plurality of page buffer groups to perform the buffer operation such that a performing time period of the last started page buffer group does not overlap with the performing time periods of other page buffer groups.

In some examples, providing the buffer operation command to the plurality of page buffer groups, and controlling the performing time periods for the plurality of page buffer groups to perform the buffer operation such that some performing time periods among the plurality of performing time periods overlaps comprises: for each of the memory planes, providing the buffer operation command to the plurality of page buffer groups, and controlling the performing time periods for the plurality of page buffer groups to perform the buffer operation such that the performing time periods of at least two page buffer groups among the page buffer groups other than the first and last started page buffer groups overlap completely.

In some examples, the buffer operation comprises a program buffer operation and a read buffer operation, wherein the program buffer operation comprises storing program data to be written to the memory cell array to a corresponding page buffer, and the read buffer operation comprises storing data stored in the memory cell array to the corresponding page buffer.

In some examples, providing the buffer operation command to the plurality of page buffer groups, and controlling the performing time periods for the plurality of page buffer groups to perform the buffer operation such that some performing time periods among the plurality of performing time periods overlaps comprises: dividing the plurality of page buffer groups into a plurality of load groups, and providing the buffer operation command to the plurality of page buffer groups such that the performing time periods of various page buffer groups in each load group do not overlap.

In some examples, providing the buffer operation command to the plurality of page buffer groups, and controlling the performing time periods for the plurality of page buffer groups to perform the buffer operation such that some performing time periods among the plurality of performing time periods overlaps comprises: dividing the plurality of page buffer groups into a plurality of load groups, and providing the buffer operation command to a plurality of page buffers such that there is a first predetermined time interval between performing time periods of two load groups that are started successively.

Examples of the present disclosure further provide a memory system. The memory system comprises: one or more memory devices as described in any one of the above-mentioned examples; and a memory controller coupled with the memory device, so as to control the memory device.

Figure 2A:
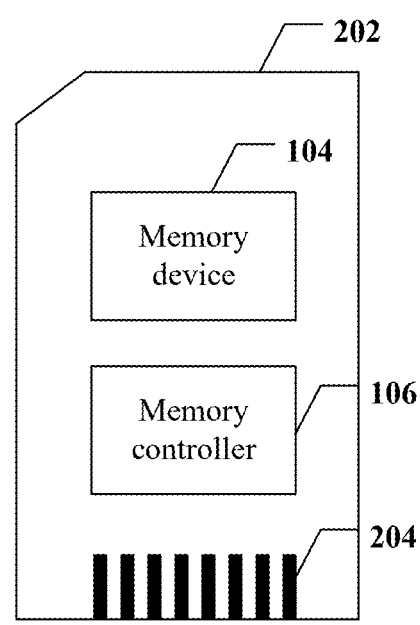
FIG. 2A shows a schematic diagram of an example memory card having a memory system according to an example of the present disclosure.
Figure 2B:
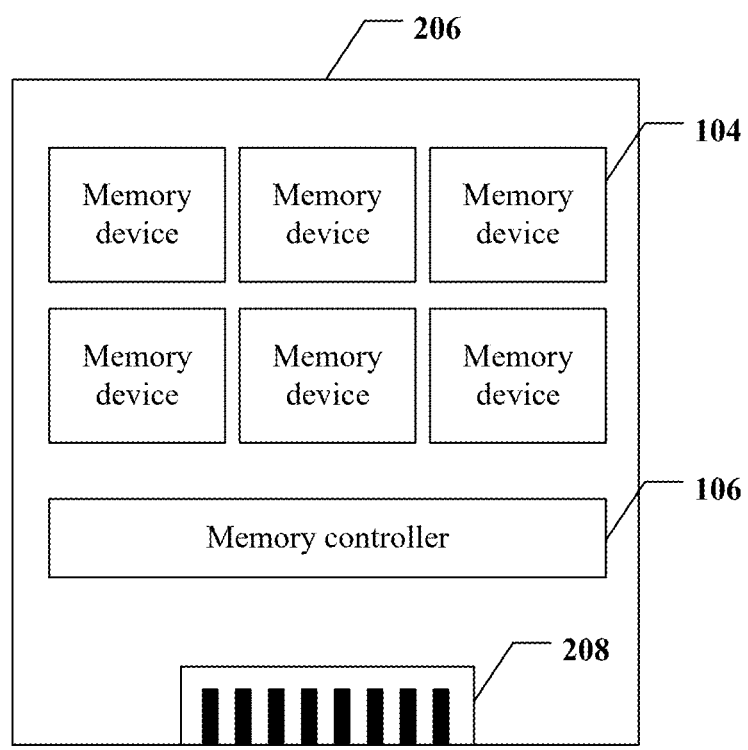
FIG. 2B shows a schematic diagram of an example solid state drive having a memory system according to an example of the present disclosure.

Here, structures and compositions with respect to the memory system may be referred to related structures and compositions of the memory system in FIGS. 1, 2A, and 2B. For simplicity, details are not described herein again.

In some examples, the memory system comprises a memory card or a solid state drive.

Examples of the present disclosure provide a memory device and an operation method thereof, and a memory system.

In a first aspect, examples of the present disclosure provide a memory device. The memory device comprises: a memory cell array comprising a plurality of memory cells, wherein the plurality of memory cells are divided into a plurality of memory planes; a plurality of bit lines; a plurality of page buffer circuits, wherein each of the page buffer circuits comprises a plurality of page buffer groups, each of the page buffer circuits corresponds to one of the plurality of memory planes and is coupled through the bit lines, and the page buffer circuit performs a buffer operation in response to a buffer operation command; and a control logic coupled to the plurality of page buffer groups and configured to: for each of the memory planes, provide the buffer operation command to the plurality of page buffer groups, and control performing time periods for the plurality of page buffer groups to perform the buffer operation such that some performing time periods among the plurality of performing time periods overlaps.

In one optional implementation, the control logic is further configured to: for each of the memory planes, provide the buffer operation command to the plurality of page buffer groups, and control the performing time periods for the plurality of page buffer groups to perform the buffer operation such that a performing time period of the first started page buffer group does not overlap with performing time periods of other page buffer groups.

In one optional implementation, the control logic is further configured to: for each of the memory planes, provide the buffer operation command to the plurality of page buffer groups, and control the performing time periods for the plurality of page buffer groups to perform the buffer operation such that a performing time period of the last started page buffer group does not overlap with the performing time periods of other page buffer groups.

In one optional implementation, the control logic is further configured to: for each of the memory planes, provide the buffer operation command to the plurality of page buffer groups, and control the performing time periods for the plurality of page buffer groups to perform the buffer operation such that the performing time periods of at least two page buffer groups among the other page buffer groups than the first and last started page buffer groups overlap completely.

In one optional implementation, the buffer operation comprises a program buffer operation and a read buffer operation, wherein the program buffer operation comprises storing program data to be written to the memory cell array to a corresponding page buffer, and the read buffer operation comprises storing data stored in the memory cell array to the corresponding page buffer.

In one optional implementation, the control logic is further configured to: for each of the memory planes, divide the plurality of page buffer groups into a plurality of load groups, and provide the buffer operation command to the plurality of page buffer groups such that the performing time periods of various page buffer groups in each of the load groups do not overlap.

In one optional implementation, the control logic is further configured to: for each of the memory planes, divide the plurality of page buffer groups into a plurality of load groups, and provide the buffer operation command to the plurality of page buffers such that there is a first predetermined time interval between performing time periods of two load groups started successively.

In one optional implementation, the memory device further comprises a page buffer management circuit. The page buffer management circuit comprises: a signal generation module configured to generate an initial start signal; and a delay module comprising M delay cells connected in series, wherein each of the delay cells is configured to generate a delay start signal having a second predetermined time interval from the initial start signal.

In one optional implementation, the second predetermined time interval is X clock periods, X is an integer greater than or equal to 1 and less than or equal to 12, and M is an integer greater than or equal to (X+1).

In one optional implementation, the memory device further comprises a page buffer management circuit. The page buffer management circuit comprises: a one-out-of-N multiplexer group, wherein the one-out-of-N multiplexer group is configured to select one of N clock periods as the first predetermined time interval, and N is an integer greater than or equal to 2.

In a second aspect, examples of the present disclosure provide an operation method of a memory device, wherein the memory device comprises: a memory cell array comprising a plurality of memory cells, wherein the plurality of memory cells are divided into a plurality of memory planes; and a plurality of page buffer circuits, wherein each of the page buffer circuits comprises a plurality of page buffer groups, each of the page buffer circuits corresponds to one of the plurality of memory planes. The method comprises: for each of the memory planes, providing the buffer operation command to the plurality of page buffer groups, and controlling performing time periods for the plurality of page buffer groups to perform the buffer operation such that some performing time periods among the plurality of performing time periods overlaps.

In one optional implementation, providing the buffer operation command to the plurality of page buffer groups, and controlling the performing time periods for the plurality of page buffer groups to perform the buffer operation such that some performing time periods among the plurality of performing time periods overlaps comprises: providing the buffer operation command to the plurality of page buffer groups, and controlling the performing time periods for the plurality of page buffer groups to perform the buffer operation such that a performing time period of the first started page buffer group does not overlap with performing time periods of other page buffer groups.

In one optional implementation, providing the buffer operation command to the plurality of page buffer groups, and controlling the performing time periods for the plurality of page buffer groups to perform the buffer operation such that some performing time periods among the plurality of performing time periods overlaps comprises: providing the buffer operation command to the plurality of page buffer groups, and controlling the performing time periods for the plurality of page buffer groups to perform the buffer operation such that a performing time period of the last started page buffer group does not overlap with the performing time periods of other page buffer groups.

In one optional implementation, providing the buffer operation command to the plurality of page buffer groups, and controlling the performing time periods for the plurality of page buffer groups to perform the buffer operation such that some performing time periods among the plurality of performing time periods overlaps comprises: providing the buffer operation command to the plurality of page buffer groups, and controlling the performing time periods for the plurality of page buffer groups to perform the buffer operation such that the performing time periods of at least two page buffer groups among the page buffer groups other than the first and last started page buffer groups overlap completely.

In one optional implementation, the buffer operation comprises a program buffer operation and a read buffer operation, wherein the program buffer operation comprises storing program data to be written to the memory cell array to a corresponding page buffer, and the read buffer operation comprises storing data stored in the memory cell array to the corresponding page buffer.

In one optional implementation, providing the buffer operation command to the plurality of page buffer groups, and controlling the performing time periods for the plurality of page buffer groups to perform the buffer operation such that some performing time periods among the plurality of performing time periods overlaps comprises: dividing the plurality of page buffer groups into a plurality of load groups, and providing the buffer operation command to the plurality of page buffer groups such that the performing time periods of various page buffer groups in each load group do not overlap.

In one optional implementation, providing the buffer operation command to the plurality of page buffer groups, and controlling the performing time periods for the plurality of page buffer groups to perform the buffer operation such that some performing time periods among the plurality of performing time periods overlaps comprises: dividing the plurality of page buffer groups into a plurality of load groups, and providing the buffer operation command to the plurality of page buffers such that there is a first predetermined time interval between performing time periods of two load groups started successively.

In a third aspect, examples of the present disclosure provide a memory system, comprising: the memory device as described in the first aspect; and a memory controller coupled to the memory device and configured to control the memory device.

The examples of the present disclosure provide the memory device and the operation method thereof, and the memory system. The memory device comprises: a memory cell array comprising a plurality of memory cells, wherein the plurality of memory cells are divided into a plurality of memory planes; a plurality of bit lines; a plurality of page buffer circuits, wherein each of the page buffer circuits comprises a plurality of page buffer groups, each of the page buffer circuits corresponds to one of the plurality of memory planes and is coupled through the bit lines, and the page buffer circuit performs the buffer operation in response to the buffer operation command; and the control logic coupled to the plurality of page buffer groups and configured to: for each of the memory planes, provide the buffer operation command to the plurality of page buffer groups, and control performing time periods for the plurality of page buffer groups to perform the buffer operation such that some performing time periods among the plurality of performing time periods overlaps. In the examples of the present disclosure, by controlling the performing time periods of the plurality of page buffer groups, some performing time periods among the plurality of performing time periods overlaps, such that the impact on program/read times can be reduced while the quality of power supply is improved compared to a solution in which there is no overlap among the plurality of performing time periods.

It is to be understood that "one example" and "an example" mentioned in the whole specification mean that particular features, structures or characteristics related to the example is included in at least one example of the present disclosure. Therefore, "in one example" or "in an example" appearing at any place of the whole specification does not necessarily refer to the same example. In addition, these particular features, structures or characteristics may be combined in one or more examples in any proper manner. It is to be understood that, in various examples of the present disclosure, the sequence number of each process described above does not mean the sequence of execution. The execution sequence of each process should be determined by its functions and internal logic, which should not constitute any limitation on the implementation process of the examples of the present disclosure. The sequence numbers of the above described examples of the present disclosure are only for description, and do not represent goodness and badness of the examples.

The above descriptions are merely preferred implementations of the present disclosure, and not intended to limit the patent scope of the present disclosure. Equivalent structure transformation made within using the contents of the specification and the drawings of the present disclosure under the inventive concept of the present disclosure, or direct/indirect application to other related technical fields are both encompassed within the patent protection scope of the present disclosure.

What is claimed is:

1. A memory device, comprising:
    a memory cell array including a plurality of memory cells, wherein the plurality of memory cells are divided into a plurality of memory planes;
    a plurality of bit lines;
    a plurality of page buffer circuits, wherein each of the page buffer circuits includes a plurality of page buffer groups, each of the page buffer circuits corresponds to one of the plurality of memory planes and is coupled through the bit line, and the page buffer circuit performs a buffer operation in response to a buffer operation command; and
    a control logic coupled to the plurality of page buffer groups and configured to, for each of the memory planes:
        provide the buffer operation command to the plurality of page buffer groups; and control performing time periods for the plurality of page buffer groups to perform the buffer operation such that some performing time periods among a plurality of performing time periods overlap.

2. The memory device of claim 1, wherein the control logic is further configured to, for each of the memory planes:
provide the buffer operation command to the plurality of page buffer groups; and
control the performing time periods for the plurality of page buffer groups to perform the buffer operation such that a performing time period of a first started page buffer group does not overlap with performing time periods of other page buffer groups.

3. The memory device of claim 1, wherein the control logic is further configured to, for each of the memory planes:
provide the buffer operation command to the plurality of page buffer groups; and
control the performing time periods for the plurality of page buffer groups to perform the buffer operation such that a performing time period of a last started page buffer group does not overlap with the performing time periods of other page buffer groups.

4. The memory device of claim 1, wherein the control logic is further configured to, for each of the memory planes:
provide the buffer operation command to the plurality of page buffer groups; and
control the performing time periods for the plurality of page buffer groups to perform the buffer operation such that the performing time periods of at least two page buffer groups among the page buffer groups other than a first and a last started page buffer groups overlap completely.

5. The memory device of claim 1, wherein the buffer operation includes a program buffer operation and a read buffer operation, wherein the program buffer operation includes storing program data to be written to the memory cell array to a corresponding page buffer, and the read buffer operation includes storing data stored in the memory cell array to the corresponding page buffer.

6. The memory device of claim 1, wherein the control logic is further configured to, for each of the memory planes:
divide the plurality of page buffer groups into a plurality of load groups; and
provide the buffer operation command to the plurality of page buffer groups such that the performing time periods of various page buffer groups in each of the load groups do not overlap.

7. The memory device of claim 1, wherein the control logic is further configured to, for each of the memory planes:
divide the plurality of page buffer groups into a plurality of load groups; and
provide the buffer operation command to a plurality of page buffers such that there is a first predetermined time interval between performing time periods of two load groups that are started successively.

8. The memory device of claim 1, further including a page buffer management circuit, wherein the page buffer management circuit includes:
a signal generation module configured to generate an initial start signal; and
a delay module including M delay cells connected in series, wherein each of the M delay cells is configured to generate a delay start signal having a second predetermined time interval from the initial start signal.

9. The memory device of claim 8, wherein the second predetermined time interval is X clock periods, X is an integer greater than or equal to 1 and less than or equal to 12, and M is an integer greater than or equal to (X+1).

10. The memory device of claim 7, further including a page buffer management circuit, wherein the page buffer management circuit includes a one-out-of-N multiplexer group, wherein the one-out-of-N multiplexer group is configured to select one of N clock periods as the first predetermined time interval, and N is an integer greater than or equal to 2.

11. An operation method of a memory device, wherein the memory device includes:
a memory cell array including a plurality of memory cells, wherein the plurality of memory cells are divided into a plurality of memory planes;
a plurality of page buffer circuits, wherein each of the page buffer circuits includes a plurality of page buffer groups, each of the page buffer circuits corresponds to one of the plurality of memory planes; and
the method comprises, for each of the memory planes:
providing a buffer operation command to the plurality of page buffer groups; and
controlling performing time periods for the plurality of page buffer groups to perform a buffer operation such that some performing time periods among a plurality of performing time periods overlap.

12. The method of claim 11, wherein providing the buffer operation command to the plurality of page buffer groups, and controlling the performing time periods for the plurality of page buffer groups to perform the buffer operation such that some performing time periods among the plurality of performing time periods overlap further includes:
providing the buffer operation command to the plurality of page buffer groups; and
controlling the performing time periods for the plurality of page buffer groups to perform the buffer operation such that a performing time period of a first started page buffer group does not overlap with the performing time periods of other page buffer groups.

13. The method of claim 11, wherein providing the buffer operation command to the plurality of page buffer groups, and controlling the performing time periods for the plurality of page buffer groups to perform the buffer operation such that some performing time periods among the plurality of performing time periods overlap further includes:
providing the buffer operation command to the plurality of page buffer groups; and
controlling the performing time periods for the plurality of page buffer groups to perform the buffer operation such that a performing time period of a last started page buffer group does not overlap with the performing time periods of other page buffer groups.

14. The method of claim 11, wherein providing the buffer operation command to the plurality of page buffer groups, and controlling the performing time periods for the plurality of page buffer groups to perform the buffer operation such that some performing time periods among the plurality of performing time periods overlap further includes:
providing the buffer operation command to the plurality of page buffer groups; and
controlling the performing time periods for the plurality of page buffer groups to perform the buffer operation such that the performing time periods of at least two page buffer groups among the page buffer groups other than a first and a last started page buffer groups overlap completely.

15. The method of claim 11, wherein the buffer operation includes a program buffer operation and a read buffer operation, wherein the program buffer operation includes storing program data to be written to the memory cell array to a corresponding page buffer, and the read buffer operation includes storing data stored in the memory cell array to the corresponding page buffer.

16. The method of claim 11, wherein providing the buffer operation command to the plurality of page buffer groups, and controlling the performing time periods for the plurality of page buffer groups to perform the buffer operation such that some performing time periods among the plurality of performing time periods overlap further includes:
   dividing the plurality of page buffer groups into a plurality of load groups; and
   providing the buffer operation command to the plurality of page buffer groups such that the performing time periods of various page buffer groups in each of the load groups do not overlap.

17. The method of claim 11, wherein providing the buffer operation command to the plurality of page buffer groups, and controlling the performing time periods for the plurality of page buffer groups to perform the buffer operation such that some performing time periods among the plurality of performing time periods overlap further includes:
   dividing the plurality of page buffer groups into a plurality of load groups; and
   providing the buffer operation command to the plurality of page buffer groups such that there is a first predetermined time interval between performing time periods of two load groups that are started successively.

18. A memory system, comprising:
   a memory device, including:
      a memory cell array including a plurality of memory cells, wherein the plurality of memory cells are divided into a plurality of memory planes;
      a plurality of bit lines;
      a plurality of page buffer circuits, wherein each of the page buffer circuits includes a plurality of page buffer groups, each of the page buffer circuits corresponds to one of the plurality of memory planes and is coupled through the bit line, and the page buffer circuit performs a buffer operation in response to a buffer operation command;
      a control logic coupled to the plurality of page buffer groups and configured to, for each of the memory planes:
         provide the buffer operation command to the plurality of page buffer groups; and
         control performing time periods for the plurality of page buffer groups to perform the buffer operation such that some performing time periods among a plurality of performing time periods overlap; and
      a memory controller coupled to the memory device and configured to control the memory device.

19. The memory system of claim 18, wherein the control logic is further configured to, for each of the memory planes:
   provide the buffer operation command to the plurality of page buffer groups; and
   control the performing time periods for the plurality of page buffer groups to perform the buffer operation such that a performing time period of a first started page buffer group does not overlap with performing time periods of other page buffer groups.

20. The memory system of claim 18, wherein the control logic is further configured to, for each of the memory planes:
   provide the buffer operation command to the plurality of page buffer groups; and
   control the performing time periods for the plurality of page buffer groups to perform the buffer operation such that a performing time period of a last started page buffer group does not overlap with the performing time periods of other page buffer groups.

* * * * *